(12) United States Patent
Ching et al.

(10) Patent No.: US 7,420,990 B2
(45) Date of Patent: Sep. 2, 2008

(54) ADAPTIVE-ALLOCATION OF I/O BANDWIDTH USING A CONFIGURABLE INTERCONNECT TOPOLOGY

(75) Inventors: Michael Ching, Los Altos, CA (US); Steven Woo, Saratoga, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 11/558,757

(22) Filed: Nov. 10, 2006

(65) Prior Publication Data

US 2007/0071032 A1 Mar. 29, 2007

Related U.S. Application Data

(62) Division of application No. 10/766,334, filed on Jan. 28, 2004, now Pat. No. 7,158,536.

(51) Int. Cl.
*H04J 3/16* (2006.01)

(52) U.S. Cl. ..................... 370/468; 370/419

(58) Field of Classification Search .............. 370/468, 370/419, 463
See application file for complete search history.

(56) References Cited

U.S. PATENT DOCUMENTS 3,115,102 A 12/1963 Niederer, Jr. et al.

(Continued)

FOREIGN PATENT DOCUMENTS

EP 1450223 A1 8/2004

(Continued)

OTHER PUBLICATIONS

Nakamura, Kazuyuki, et al., "A 6 Gbps CMOS Phase Detecting DEMUX Module Using Half-Frequency Clock," 1998 Symposium on VLSI Circuits Digest of Technical Papers, pp. 196-197.

(Continued)

*Primary Examiner*—Brian D Nguyen
(74) *Attorney, Agent, or Firm*—Vierra Magen Marcus & DeNiro LLP

(57) ABSTRACT

Apparatus and methods allocate I/O bandwidth of an electrical component, such as an IC, by configuring an I/O interface into various types of interfaces. In an embodiment of the present invention, an I/O interface is configured into either a bidirectional contact, unidirectional contact (including either a dedicated transmit or dedicated receive contact) or a maintenance contact used in a maintenance or calibration mode of operation. The I/O interface is periodically reconfigured to optimally allocate I/O bandwidth responsive to system parameters, such as changing data workloads in the electronic components. System parameters include, but are not limited to, 1) number of transmit-receive bus turnarounds; 2) number of transmit and/or receive data packets; 3) user selectable setting 4) number of transmit and/or receive commands; 5) direct requests from one or more electronic components; 6) number of queued transactions in one or more electronic components; 7) transmit burst-length setting, 8) duration or cycle count of bus commands, and control strobes such as address/data strobe, write enable, chip select, data valid, data ready; 9) power and/or temperature of one or more electrical components; 10) information from executable instructions, such as a software application or operating system; 11) multiple statistics over respective periods of time to determine if using a different bandwidth allocation would result in better performance. The importance of a system parameter may be weighted over time in an embodiment of the present invention.

17 Claims, 20 Drawing Sheets

U.S. PATENT DOCUMENTS

| | | | |
|---|---|---|---|
| 3,638,121 A | 1/1972 | Spilker, Jr. | |
| 3,922,491 A | 11/1975 | Bjork | |
| 4,384,354 A | 5/1983 | Crawford | |
| 4,648,133 A | 3/1987 | Vilnrotter | |
| 5,111,208 A | 5/1992 | Lopez | |
| 5,122,978 A | 6/1992 | Merrill | |
| 5,243,626 A | 9/1993 | Devon | |
| 5,265,211 A | 11/1993 | Amini et al. | |
| 5,436,908 A | 7/1995 | Fluker | |
| 5,485,490 A | 1/1996 | Horowitz | |
| 5,485,602 A | 1/1996 | Ledbetter, Jr. et al. | |
| 5,511,091 A | 4/1996 | Saito | |
| 5,523,760 A | 6/1996 | McEwan | |
| 5,548,146 A | 8/1996 | Kuroda | |
| 5,554,945 A | 9/1996 | Lee | |
| 5,621,913 A | 4/1997 | Tuttle | |
| 5,671,376 A | 9/1997 | Bucher et al. | |
| 5,684,966 A | 11/1997 | Gafford et al. | |
| 5,742,798 A | 4/1998 | Goldrian | |
| 5,771,356 A | 6/1998 | Leger et al. | |
| 5,859,881 A | 1/1999 | Ferraiolo | |
| 6,047,346 A | 4/2000 | Lau | |
| 6,163,570 A | 12/2000 | Olafsson | |
| 6,173,345 B1 | 1/2001 | Stevens | |
| 6,181,166 B1 | 1/2001 | Krishnamurthy et al. | |
| 6,219,384 B1 | 4/2001 | Kliza et al. | |
| 6,243,776 B1 | 6/2001 | Lattimore et al. | |
| 6,282,210 B1 | 8/2001 | Rapport | |
| 6,321,282 B1 | 11/2001 | Hampel | |
| 6,359,931 B1 | 3/2002 | Perino | |
| 6,369,652 B1 | 4/2002 | Lau | |
| 6,377,640 B2 | 4/2002 | Trans | |
| 6,396,329 B1 | 5/2002 | Zerbe | |
| 6,421,389 B1 | 7/2002 | Jet | |
| 6,434,081 B1 | 8/2002 | Johnson | |
| 6,442,644 B1 | 8/2002 | Gustavson | |
| 6,448,815 B1 | 9/2002 | Talbot | |
| 6,457,089 B1 * | 9/2002 | Robbins et al. | 710/306 |
| 6,463,392 B1 | 10/2002 | Nygaard | |
| 6,469,555 B1 | 10/2002 | Sidiropoulos | |
| 6,473,439 B1 | 10/2002 | Zerbe | |
| 6,480,026 B2 | 11/2002 | Andrews et al. | |
| 6,484,232 B2 | 11/2002 | Olarig | |
| 6,510,503 B2 | 1/2003 | Gillingham | |
| 6,539,072 B1 | 3/2003 | Donnelly | |
| 6,556,934 B2 | 4/2003 | Higashide | |
| 6,560,716 B1 | 5/2003 | Gasparik | |
| 6,606,350 B2 | 8/2003 | Dress, Jr. | |
| 6,606,576 B2 | 8/2003 | Sessions | |
| 6,643,787 B1 | 11/2003 | Zerbe | |
| 6,657,468 B1 | 12/2003 | Best | |
| 6,662,305 B1 | 12/2003 | Salmon | |
| 6,690,741 B1 | 2/2004 | Larrick, Jr. | |
| 6,717,992 B2 | 4/2004 | Cowie | |
| 6,725,304 B2 | 4/2004 | Arimilli et al. | |
| 6,751,696 B2 * | 6/2004 | Farmwald et al. | 710/305 |
| 6,873,939 B1 | 3/2005 | Zerbe et al. | |
| 6,889,357 B1 | 5/2005 | Keeth | |
| 6,920,540 B2 | 7/2005 | Hampel et al. | |
| 7,099,424 B1 | 8/2006 | Chang et al. | |
| 7,119,549 B2 | 10/2006 | Lee | |
| 7,137,048 B2 | 11/2006 | Zerbe et al. | |
| 2001/0048382 A1 | 12/2001 | Low et al. | |
| 2001/0053175 A1 | 12/2001 | Hoctor et al. | |
| 2001/0056332 A1 | 12/2001 | Abrosimov et al. | |
| 2002/0054648 A1 | 5/2002 | Krummrich | |
| 2002/0071431 A1 | 6/2002 | Kosaraju | |
| 2002/0072870 A1 | 6/2002 | Adam et al. | |
| 2002/0138224 A1 | 9/2002 | Sessions | |
| 2002/0149824 A1 | 10/2002 | Beaulieu et al. | |
| 2003/0026399 A1 | 2/2003 | Carlson | |
| 2003/0063597 A1 | 4/2003 | Suzuki | |
| 2003/0065845 A1 | 4/2003 | Riley | |
| 2003/0146800 A1 | 8/2003 | Dvorak | |
| 2003/0149991 A1 | 8/2003 | Reidhead et al. | |
| 2003/0158994 A1 | 8/2003 | Moy | |
| 2003/0198212 A1 | 10/2003 | Hoctor et al. | |
| 2003/0198308 A1 | 10/2003 | Hoctor et al. | |
| 2003/0221061 A1 | 11/2003 | El-Batal et al. | |
| 2004/0032354 A1 | 2/2004 | Knobel et al. | |
| 2004/0054830 A1 | 3/2004 | Craft et al. | |
| 2004/0057500 A1 | 3/2004 | Balachandran et al. | |
| 2004/0217881 A1 | 11/2004 | Pedyash et al. | |
| 2004/0260858 A1 * | 12/2004 | Primrose | 710/316 |
| 2005/0081942 A1 | 4/2005 | Schwane et al. | |
| 2005/0163202 A1 | 7/2005 | Hampel | |

FOREIGN PATENT DOCUMENTS

JP           20035831 A2      2/2000

OTHER PUBLICATIONS

Rambus, Inc., "RDRAM Direct Rambus Clock Generator," (Apr. 2002), 22 pages.

Nakase, Yasunobu, et al., "Source-Synchronization and Timing Vernier Techniques for 1.2-GB/s SLDRAM Interface," IEEE Journal of Solid-State Circuits, Apr. 1999, vol. 34, No. 4, pp. 494-501.

Poulton, John, et al., "A Tracking Clock Recovery Receiver for 4Gb/s Signaling," Hot Interconnects '97, Aug. 21-23, 1997, Palo Alto, CA, pp. 1-13.

Rambus "Direct Rambus Long Channel Design Guide," (2002), 45 pages.

Chang, Ken K.Y., et al., "A 2 Gb/s Asymmetric Serial Link for High-Bandwidth Packet Switches," Hot Interconnects V, Stanford University, Aug. 1997, pp. 1-9.

U.S. Appl. No. 10/278,708, filed Oct. 22, 2002, entitled, "Phase Adjustment Apparatus and Method for a Memory Device Signaling System."

"Draft Standard for a High-Speed Memory Interface (SyncLink)," Draft 0.99 IEEE P1596.7-199X, (1996), pp. 1-56.

Gillingham, Peter & Vogley, Bill, "SLDRAM: High Performance Open-Standard Memory," IEEE Micro, Nov./Dec. 1997, vol. 17, No. 6, pp. 29-39, Institute of Electrical and Electronics Engineer, Inc., Los Alamitos, California.

"400 Mb/s/pin SLDRAM," Draft Advance, "4M ×18 SLDRAM, Pipelined, Eight Bank, 2.5V Operation," Rev. Jul. 9, 1998, pp. 1-69, Copyright 1998, SLDRAM Inc.

Rambus "Direct Short Channel Layout Guide, Version 0.95," (Aug. 2001), 40 pages.

Gillingham, Peter, "SLDRAM Architectural and Functional Overview," SLDRAM Consortium, SLDRAM Inc., Aug. 29, 1997, pp. 1-14.

Widmer, A.X., et al., "A DC-Balanced, Partioned-Block, 8B/10B Transmission Code," IBM J. Res. Develop., vol. 27, No. 5, Sep. 1983, 440-451.

Lee, Ming-Ju Edward, et al., "TP 15.3: A 90mW 4Gb/s Equalized I/O Circuit with Input Offset Cancellation," IEEE International Solid-State Circuits Conference, pp. 252-253.

Banu, Mihai, et al., "TA 6.4: A 660Mv/s CMOS Clock Recovery Circuit with Instantaneous Locking for NRZ Data and Burst-Mode Transmission," IEEE International Solid-State Circuits Conference, 1993, pp. 102-103, 270.

Paris, Lluis, et al., "WP 24.3 A 800MB/s 72Mb SLDRAM with Digitally-Calibrated DLL," IEEE International Solid-State Circuits Conference (1999), 10 pages.

Lewis, Dave, "Easy-to-Use LVDS Serdes for the Serdes Neophyte," National Semiconductor, Jun. 16, 2003, pp. 1-5.

EIA/JEDEC Standard No. 8-B (JESD8-B), "Interface Standard for Nominal 3 V/3.3 V Supply Digital Integrated Circuits," Sep. 1999, 10 pages.

Win, Moe Z., et al., "Impulse Radio: How It Works," IEEE Communications Letters 2(2), Feb. 1998, pp. 36-38.

RDRAM® Overview, "High Performance Memory Interface Solution," Copyright 2003 Rambus, Inc., all rights reserved, 4 pages.

Redwood Technology Brief, "High Performance Parallel Bus Interface Technology," Copyright 2003 Rambus, Inc., all rights reserved, 2 pages.

Intel "How to Measure RDRAM* System Clock Jitter," Application Note AP-667, Jun. 1999, pp. 1-15.

EIA/JEDEC Standard No. 8-6 (EIA/JESD8-6), "High Speed Transceiver Logic (HSTL) A 1.5 V Output Buffer Supply Voltage Based Interface Standard for Digital Integrated Circuits," Aug. 1995, 16 pages.

Cerisola, M., et al., "CORD—a WDM Optical Network: Control Mechanism Using Subcarrier Multiplexing and Novel Synchronization Solutions," Communications on, 1995. ICC 95 Seattle, Gateway to Globalization, 1995 IEEE International Conference, vol. 1, Jun. 18-22, 1995, pp. 261-265.

Eldering, Charles A., et al., "Digital Burst Mode Clock Recovery Technique for Fiber-Optic Systems," Journal of Lightwave Technology, vol. 12, No. 2, Feb. 1994, pp. 271-279.

JEDEC Standard—JESD8-16, "Bus Interconnect Logic (BIC) for 1.2 Volts," Apr. 2004, 15 pages.

Chang, Kun-Yung, "Design of a CMOS Asymmetric Serial Link," A Dissertation Submitted to the Department of Electrical Engineering and the Committee on Graduate Studies of Stanford University, Aug. 1989, 119 pages.

Daniele, N., et al., "Principle and Motivations of UWB Technology for High Data Rate WPAN Applications," SOC 2003, 4 pages.

Hu, Timothy H., et al., "A Monolithic 480 Mb/s Parallel AGC/Decision/Clock-Recovery Circuit in 1.2 μm CMOS," IEEE Journal of Solid-State Circuits, vol. 28, No. 12, Dec. 1993, pp. 1314-1320.

Daniele, Norbert, "Ultra Wide Band Principles and Applications for Wireless Communications," CEA-LETI Anual Review, Jun. 25-26, 2002, 24 pages.

Yellowstone Technology Brief, "High Performance Memory Interface Technology," Copyright 2003 Rambus, Inc., all rights reserved, 2 pages.

RaSer™ X Product Brief, "Highly Flexible 10 Gbps Backplane Serial Link Interface," Copyright 2003 Rambus, Inc., all right reserved, 2 pages.

Kim, Sungioon, et al., "An 800 Mbps Multi-Channel CMOS Serial Link with 3x Oversampling," IEEE 1995 Custom Integrated Circuits Conference, pp. 22.7.1-22.7.4.

Yang, Chih-King Ken, "Design of High-Speed Serial Links in CMOS," Technical Report No. CSL-TR-98-775, Sponsored by Center for Integrated Systems, Sun Microsystems and LSI Logic Inc., Dec. 1998, pp. 1-182.

Dally, W., et al., "Digital Systems Engineering," Cambridge University Press, 1998, pp. 447-449.

European Search Report in European Patent Application No. 05 706 081.6.

Examination Report, European Patent Office, European Patent Application No. 05 706 081.6, Nov. 6, 2007.

* cited by examiner

ADAPTIVE-ALLOCATION OF I/O BANDWIDTH USING A CONFIGURABLE INTERCONNECT TOPOLOGY

CROSS-REFERENCE TO RELATED APPLICATIONS

This application is a divisional of 10/766,334 filed Jan. 28, 2004 U.S. Pat. No. 7,158,536 which was issued on Jan. 2, 2007.

FIELD OF THE INVENTION

The present invention relates to transferring electrical signals.

BACKGROUND

An interconnect, such as a bus or point-to-point link, is used to transfer electrical signals between electronic components, such as integrated circuits ("ICs"), printed circuit boards or electronic devices. A bus denotes a plurality of signal lines, each signal line typically having two or more connection points for "transceiving" (i.e. transmitting or receiving). Each connection point electrically connects or couples to a transceiver circuit (i.e. transmitter-receiver) or one of a single transmitter or receiver circuit. A "point-to-point link" denotes one or a plurality of signal lines, each signal line typically having two transceiver connection points, each transceiver connection point coupled to a transmitter circuit, a receiver circuit or a transceiver circuit. For example, a point-to-point link may include a transmitter coupled at or near one end and a receiver coupled at or near the other end. Both a bus and point-to-point link include a "link" denoted as at least one signal line, each having at least two connection points. Each connection point is electrically coupled to a transmitter circuit, a receiver circuit or a transceiver circuit.

Depending upon the function or intended workload of an electronic component, a contact at an electronic component input/output ("I/O") interface may be assigned a particular electrical signal direction. An electronic component interface, in particular the number and type of contacts, limits the amount of electrical signals that can be transferred or I/O bandwidth. For example, an electronic component may have a large number of bidirectional contacts when the number of electrical signals transmitted or received by the electronic component varies greatly. A bidirectional contact is denoted as a contact, which in use, both transmits and receives an electrical signal. However, bidirectional contacts require time for "turnaround" or transitioning between transmitting and receiving electrical signals. In some electronic components such as Dynamic Random Access Memory ("DRAM"), required time for "turnaround" of bidirectional contacts also depend on delay of transitioning state machines of internal circuitry of the DRAM. This turnaround time consumes available time for transferring electrical signals and thus lowers interface electrical signal transfer efficiency or I/O bandwidth. In contrast, an electronic component may have a large number of unidirectional contacts when the number of electrical signals to be transmitted and received is generally known. A unidirectional contact is denoted as a contact, which is used in either transmitting or receiving an electrical signal. Unidirectional contacts do not require turnaround time and thus increase interface electrical signal transfer efficiency or I/O bandwidth, but unidirectional contacts also do not have the flexibility of being able to efficiently handle a large variation in the number of transmitted or received signals.

Accordingly, it is desirable to provide an apparatus and method for adaptively configuring an electronic component interface to include the appropriate number and type of contacts for transferring electrical signals.

DETAILED DESCRIPTION

Apparatus and methods allocate I/O bandwidth of an electrical component, such as an IC, by configuring an I/O interface into various types of interfaces. In an embodiment of the present invention, an I/O interface is configured to be either bidirectional, unidirectional (including either a dedicated transmit or dedicated receive contact) or for maintenance purposes (e.g., using a contact for maintenance or a calibration mode of operation). The I/O interface is set at initialization through by default or user selectable settings. The I/O interface may be periodically reconfigured to optimally allocate I/O bandwidth responsive to system parameters, such as changing data workloads in the electronic components. System parameters include, but are not limited to: 1) number of transmit-receive bus turnarounds; 2) number of transmit and/or receive commands; 3) number of transmit and/or receive data packets; 4) profile of transmit/receive burst lengths; 5) direct requests from one or more electronic components; 6) number of queued transactions in one or more electronic components; 7) duration or cycle count of bus commands, and control strobes such as write enable, chip select, data valid, data ready; 8) power and/or temperature of one or more electrical components; 9) information from executable instructions, such as a software application or operating system; 10) user-selectable configuration setting or override; 11) multiple statistics over respective periods of time to determine if using a different bandwidth allocation would result in better performance. The importance of a system parameter may be weighted over time in an embodiment of the present invention.

Figure 2:
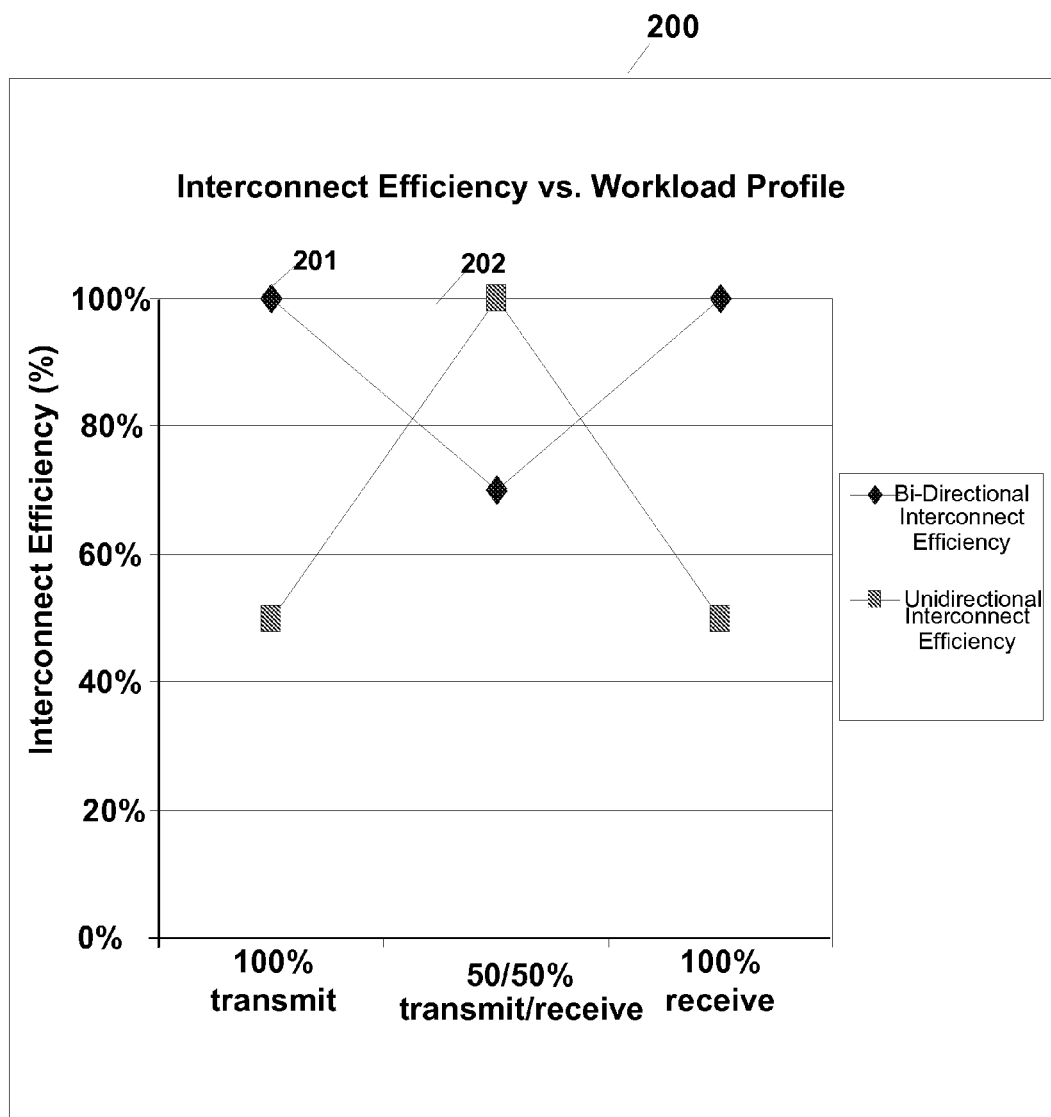
FIG. 2 is a chart illustrating bus efficiency as a function of interconnect topology and a ratio of transmit/receive data.

The I/O interconnect efficiency (shown in FIG. 2) of an apparatus is determined by the interconnect topology and the workload transmitted between the interconnected electronic components. Bi-directional interfaces or contacts offer more flexibility for workloads with varying ratios of transmit to receive data. However, electrical bus or interconnect turn-around times between transmit and receive data consumes a portion of the total available transmit time. As shown by curve 201 in chart 200 of FIG. 2, the I/O interconnect efficiency approaches 100% when the workload is entirely transmit or receive since interconnect turnaround does not occur in those cases. The worst-case workload is 50%/50% interleaved transmit/receive data; where electrical interconnect turnaround most degrades I/O interconnect efficiency. In this example, the I/O interconnect efficiency is shown degraded to 70%. Actual degradation from electrical interconnect turnaround is determined by the data burst length, data transmit time, and interconnect turnaround time. Chart 200 illustrates only I/O interconnect efficiency and does not account for other loss of bus efficiency such as memory core bank conflicts, data-stalls, etc.

For cases such as 50%/50% interleaved transmit/receive data, I/O interconnect efficiency may be increased by configuring half the I/O interface to unidirectional transmit contacts and the remaining interface to unidirectional receive contacts. Unidirectional contacts do not require an interconnect turn-around, leading to 100% efficiency for specific workloads as shown by curve 202 in FIG. 2. However, unidirectional contacts offer lower efficiency for workloads away from one specific ratio of transmit/receive data. Secondary effects of unidirectional contacts include fixed latency since there is no potential wait for bus turnaround, and slightly longer fill-times since it takes longer to transmit a specific amount of data.

Figure 1:
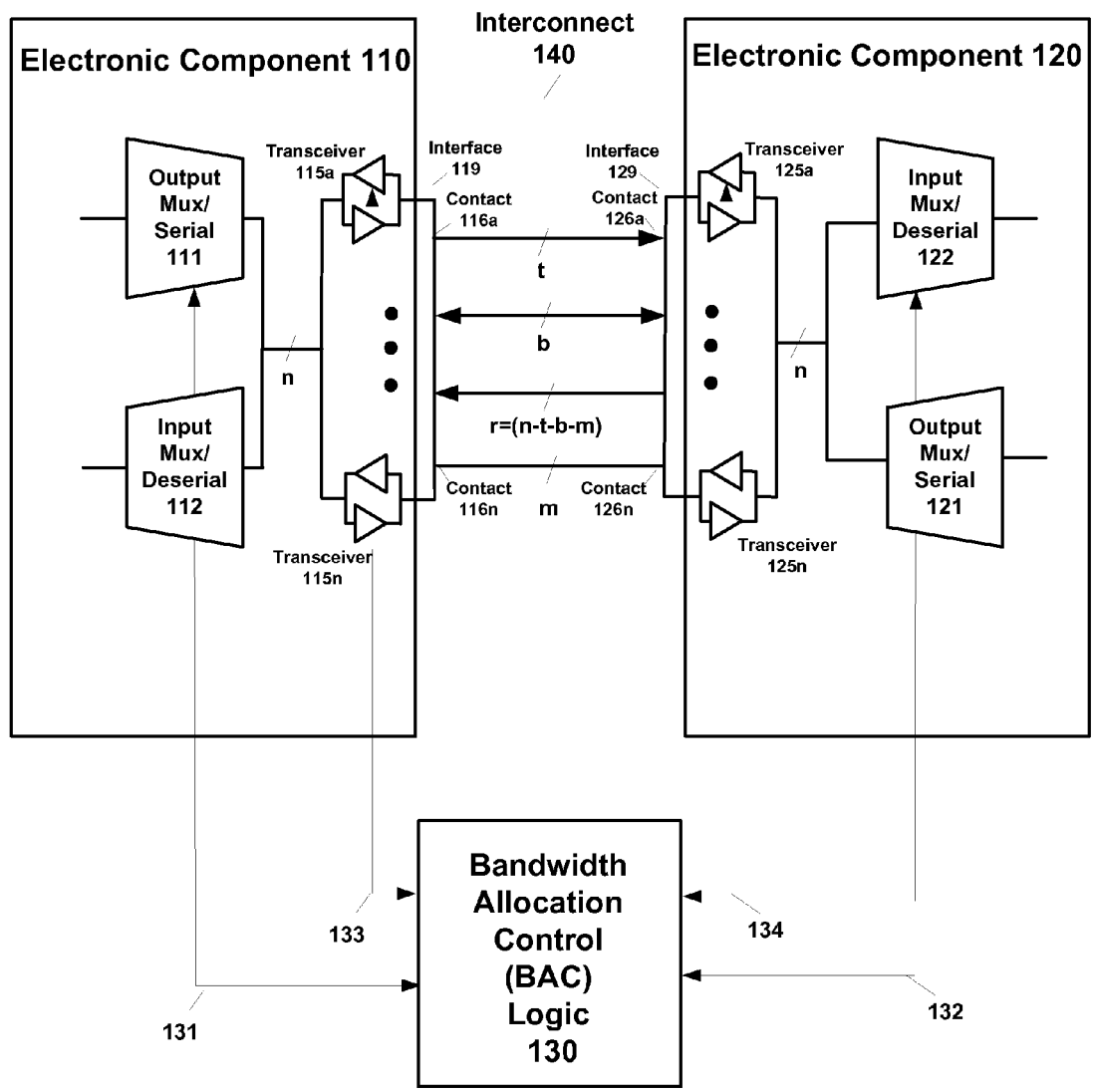
FIG. 1 illustrates an apparatus 100 including Bandwidth Allocation Control logic 130 according to an embodiment of the present invention.

FIG. 1 illustrates an apparatus 100 including electronic component 110 coupled to electronic component 120 by interconnect 140. In an embodiment of the present invention, electronic components 110 and 120 are logic circuits formed on discretely packaged semiconductor substrates, respectively. In an alternate embodiment, electronic component 110 is a master device, such as a memory controller, general purpose processor or graphics processor, and electronic component 120 is at least one discretely packaged IC or chip, such as a memory device, coprocessor, or peripheral I/O bridge, communicating with the master device. In another embodiment, electronic components 110 and 120 may be integrated circuits, which communicate with one another.

In an embodiment of the present invention, a memory device is a common class of integrated circuit devices that have an array of memory cells, such DRAM, Read Only Memory ("ROM"), Ferroelectric RAM ("FRAM"), Magnetoresitive or Magnetic RAM ("MRAM"), Static Access Memory ("SRAM"), flash memory ("Flash"), double data rate SDRAM ("DDR") or an equivalent thereof. Examples of memory devices include Direct Rambus® memory devices ("DRDRAM"), XDR™ memory devices or an equivalent thereof.

In an embodiment of the present invention, electronic component 120 is a memory module including a plurality of memory devices positioned on a substrate having a connector interface.

In an embodiment of the present invention, electronic components 110 and 120 are located on the same printed circuit board or on different respective circuit boards. In an embodiment of the present invention, electronic components 110 and 120, singly or in combination, are included in a processing device, such as a general-purpose computer, server, video game console, computer graphics card or printer.

In yet another embodiment of the present invention, more than two electronic components are coupled by interconnect 140.

In an embodiment of the present invention, interconnect 140 is a bus or point-to-point link for transferring electrical signals between at least two electronic components, in particular electronic component interfaces. In an embodiment of the present invention, a conducting element in interconnect 140 is a wire or a metal trace for conducing an electrical signal. One or more terminators (e.g. a resistive element) may terminate each signal line in interconnect 140 in an embodiment of the present invention.

Interconnect 140 transfers electrical signals that may include data, control and maintenance signals, singly or in combination. Data and control signals, including multiple dedicated data or control signal groups, may be multiplexed or transferred on dedicated lines in embodiments of the present invention. Voltage or current mode signaling may be employed. In an embodiment of the present invention, clock information for sampling data and control signals are transferred on interconnect 140.

Clocking methods employed in the synchronization of events in apparatus 100 include any of globally synchronous clocking (i.e., where a single clock frequency source is distributed to various electronic components); source synchronous clocking (i.e., where data is transported alongside the clock from the source to the destination such that the clock and data become skew tolerant) and encoding the data and the clock together. In one embodiment, differential signaling is employed and is transported over differential pair lines. In alternate embodiments, one or more common voltage or current references are employed with respective one or more current/voltage mode level signaling. In yet other embodiments, multi-level signaling—where information is transferred using symbols formed from multiple signal (i.e., voltage/current) levels is employed.

Signaling over interconnect 140 may incorporate different modulation methods such as non-return to zero ("NRZ"), multi-level pulse amplitude modulation ("PAM"), phase shift keying, delay or time modulation, quadrature amplitude modulation ("QAM") and Trellis coding. Other signaling methods and apparatus may be employed by interconnect 140, for example, optical fiber, capacitively or RF coupled components based apparatus and methods.

In an embodiment of the present invention, data is transferred using transmit and receive commands along with data packets. Transmit commands may include, but are not limited to, Read, Write or Precharge commands.

Electronic components 110 and 120 each include interfaces 119 and 129, respectively. In an embodiment of the present invention, interfaces 119 and 129 include a plurality of respective contacts 116a-n and 126a-n. A contact is a conducting element or node for inputting or outputting an electrical signal to or from an electronic component. A contact may include a metal surface, wire, pin or equivalent thereof in embodiments of the present invention.

Interconnect 140 includes: n signal lines in an embodiment of the present invention; t signal lines for transmitting electrical signals from electronic component 110 to electronic component 120; b signal lines for both transmitting and receiving electrical signals between electronic components 110 and 120; r signal lines (n-t-b-m) for receiving electrical signals from electronic component 120 to electronic component 110; and m signal lines for maintenance modes of operation. In an embodiment of the present invention, n signal lines are respectively coupled to contacts 116a-n in interface 119 and contacts 126a-n in interface 129. In an embodiment of the present invention, contacts 116a-n are respectively coupled to transceivers 115a-n, and contacts 126a-n are respectively coupled to transceivers 126a-n.

Transceivers 115a-n and 125a-n include transmit and receive circuits for operating in either a bidirectional or unidirectional mode of operation responsive to control signals 133 and 134 from Bandwidth Allocation Control ("BAC") logic 130. In a bidirectional mode of operation, a transceiver is able to transmit or receive an electrical signal after a turnaround time. In a unidirectional mode of operation, a transceiver is able to only transmit or only receive an electrical signal. In a maintenance mode of operation, a transceiver is disabled for transmitting or receiving data. In an embodiment of the present invention, each transceiver 115a-n and 125a-n is coupled to a programmable register that determines the mode of operation of the transceiver responsive to control signals 133 and 134.

Interfaces 119 or 129, singly, are configured when at least one transceiver is changed from one mode of operation to another. Both interfaces 119 and 120 are configured when at least two transceivers coupled to a common signal line is changed from one mode of operation to another same or complementary mode of operation. For example, interface 129 may be configured by programming n/2 transceivers into a unidirectional mode of operation (transmit) and programming n/2 transceivers into a bidirectional mode of operation. Similarly, interface 119 may be configured by programming n/2 transceivers into a unidirectional mode of operation (receive, and coupled to the same respective signal lines as the unidirectional transceivers in electronic component 120) and programming n/2 transceivers into a bidirectional mode of operation. Thus, in embodiments of the present invention, an interface is configured by changing the mode of operation of a plurality of transceivers, where respective sets of transceivers in the plurality of transceivers operate in the same or complementary mode, and where a set may include the null or zero set.

In embodiments of the present invention, an electronic component may have multiple transceivers operating in a unidirectional mode of operation (e.g. two transceivers where one operates by transmitting only and the other operates by receiving only, or two transceivers where both operate by transmitting or receiving). A unidirectional mode of operation may include different burst lengths in embodiments of the present invention. For example, a transceiver operating in a transmit unidirectional mode of operation in electronic component 110 may transfer a burst length greater than a transceiver operating in a transmit unidirectional mode of operation in electronic component 120. A unidirectional mode of operation may also transfer data out of order or in parallel in embodiments of the present invention.

In an embodiment of the present invention, transceivers 115a-n are coupled to Output Mux/Serial circuit 111 and Input Mux/Deserial circuit 112 in electronic component 110. Output Mux/Serial circuit 111 transforms parallel signals to serial signals on transceivers 115a-n. Input Mux/Deserial circuit 112 transforms serial signals on transceivers 115a-n to parallel signals. Output Mux/Serial circuit 111 and Input Mux/Deserial circuit 112 are configured in response to a control signal 131 from BAC logic 130.

Transceivers 125a-n are coupled to Output Mux/Serial circuit 121 and Input Mux/Deserial circuit 122 in electronic component 120. Output Mux/Serial circuit 121 transforms parallel signals to serial signals on transceivers 125a-n. Input Mux/Deserial circuit 122 transforms serial signals on transceivers 125a-n to parallel signals. Output Mux/Serial circuit 111 and Input Mux/Deserial circuit 122 are configured in response to a control signal 132 from BAC logic 130.

In an embodiment of the present invention, Output Mux/Serial circuit 111, Input Mux/Deserial circuit 112, Input Mux/Deserial circuit 122 and Output Mux/Serial circuit 121 are coupled to respective first-in-first-out ("FIFO") buffers that may reorder the data information.

In an alternate embodiment of the present invention, electronic components 110 and 120 do not employ output mux/serial or input mux/deserial circuits. The electrical circuitry coupled to transceivers 115a-n and transceivers 125a-n respectively accommodate varying bit-widths of input and output signals directly or through its combinatorial logic or digital signal processing techniques.

BAC logic 130 generates control signals to and from transceivers 115a-n and 125a-n as well as to Output Mux/Serial circuit 111, Input Mux/Deserial circuit 112, Input Mux/Deserial circuit 122 and Output Mux/Serial circuit 121 in order to configure interfaces 119 and 129. In an embodiment of the present invention, BAC logic control signals are transferred on interconnect 140 by an encoded command. In an alternate embodiment of the present invention, BAC logic 130 is included in either electronic component 110 or 120. In still a further embodiment of the present invention, BAC logic 130 is located on a separate electronic component than electronic components 110 and 120 or is implemented in a virtual manner through software code or executable instructions. In yet a further embodiment of the present invention, further logic for configuring interfaces are also located in either or both electronic components 110 and 120. In an embodiment of the present invention, BAC logic 130, as well as other logic described herein, includes hardware and software, singly or in combination.

Figure 3:
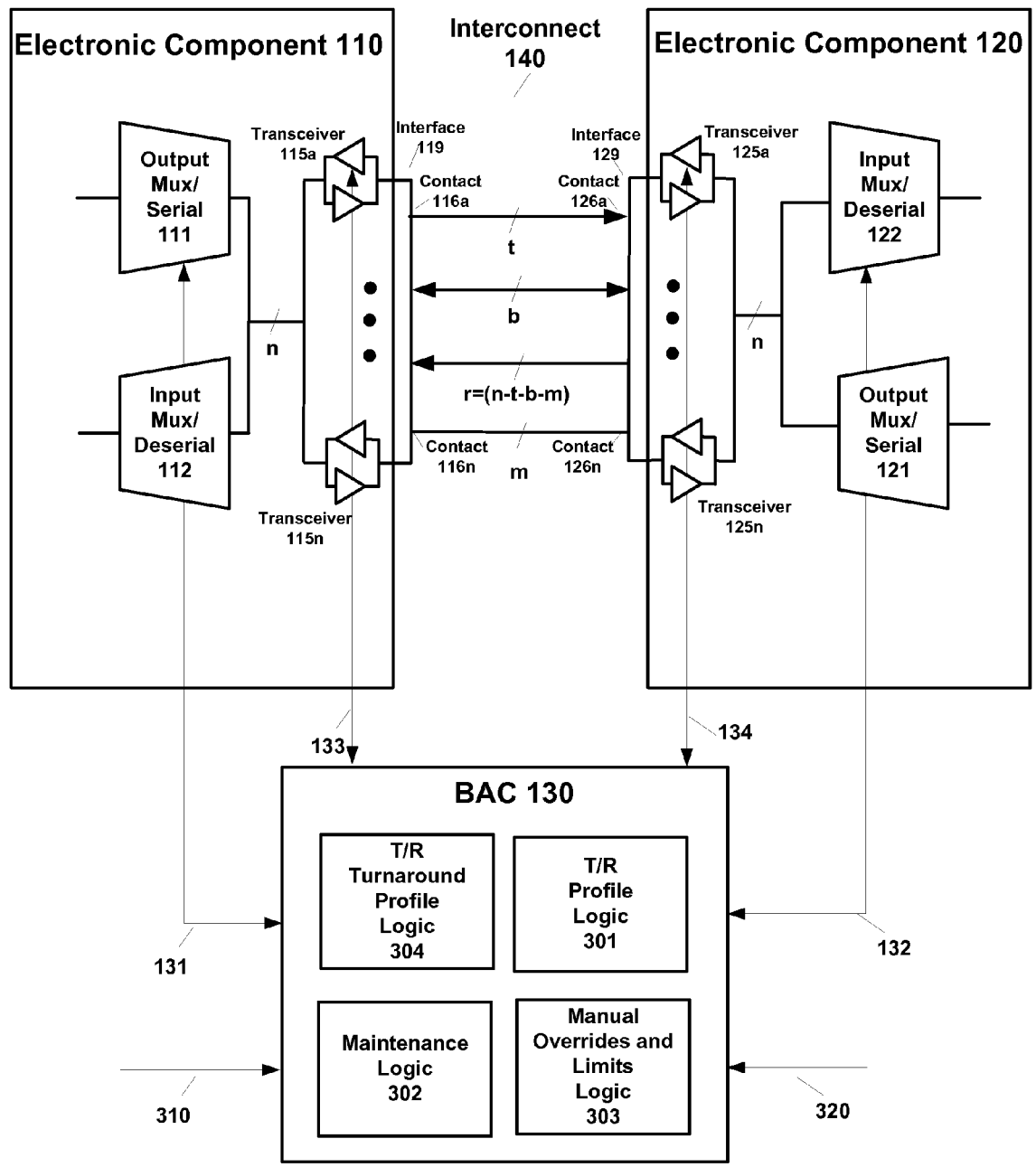
FIG. 3 illustrates an apparatus 300 including Bandwidth Allocation Control logic having Transmit-Receive Turnaround logic, Transmit-Receive logic, Maintenance logic, and Manual Override and Limits logic according to an embodiment of the present invention.

FIG. 3 illustrates an apparatus 300 including various types of logic, singly or in combination, in BAC logic 130 for configuring interfaces 119 and 129 responsive to a variety of respective system parameters in embodiments of the present invention. Apparatus 300 includes like referenced elements shown in FIG. 1 that operate similarly and are described above. However, BAC logic 130 includes Transmit and Receive ("T/R") Turnaround Profile logic 304, T/R Profile logic 301, Maintenance logic 302 and Manual Overrides and Limits logic 303, singly or in combination, in embodiments of the present invention. A Manual Override and Limits signal 310 is input to Manual Overrides and Limits logic 303 in an embodiment of the present invention. Also, a Maintenance signal 310 is input to Maintenance logic 302 in an embodiment of the present invention.

Apparatus 300, shown in FIG. 1, is preferred for electronic components, such as ICs, with low I/O contact requirements and low available system board area. As a default or at apparatus 300 initialization, interfaces 119 and 129 are configured to bidirectional interfaces in an embodiment of the present invention. BAC logic 130, in particular T/R Turnaround Profile logic 304 and T/R Profile logic 301, monitors bus traffic and reconfigures interfaces 119 and 129 in response to interconnect 140 traffic values. T/R Turnaround Profile logic 304 monitors a number of interconnect turnarounds for a period of time and T/R Profile logic monitors the amount of transmitted data and received data over a period of time.

Figure 4:
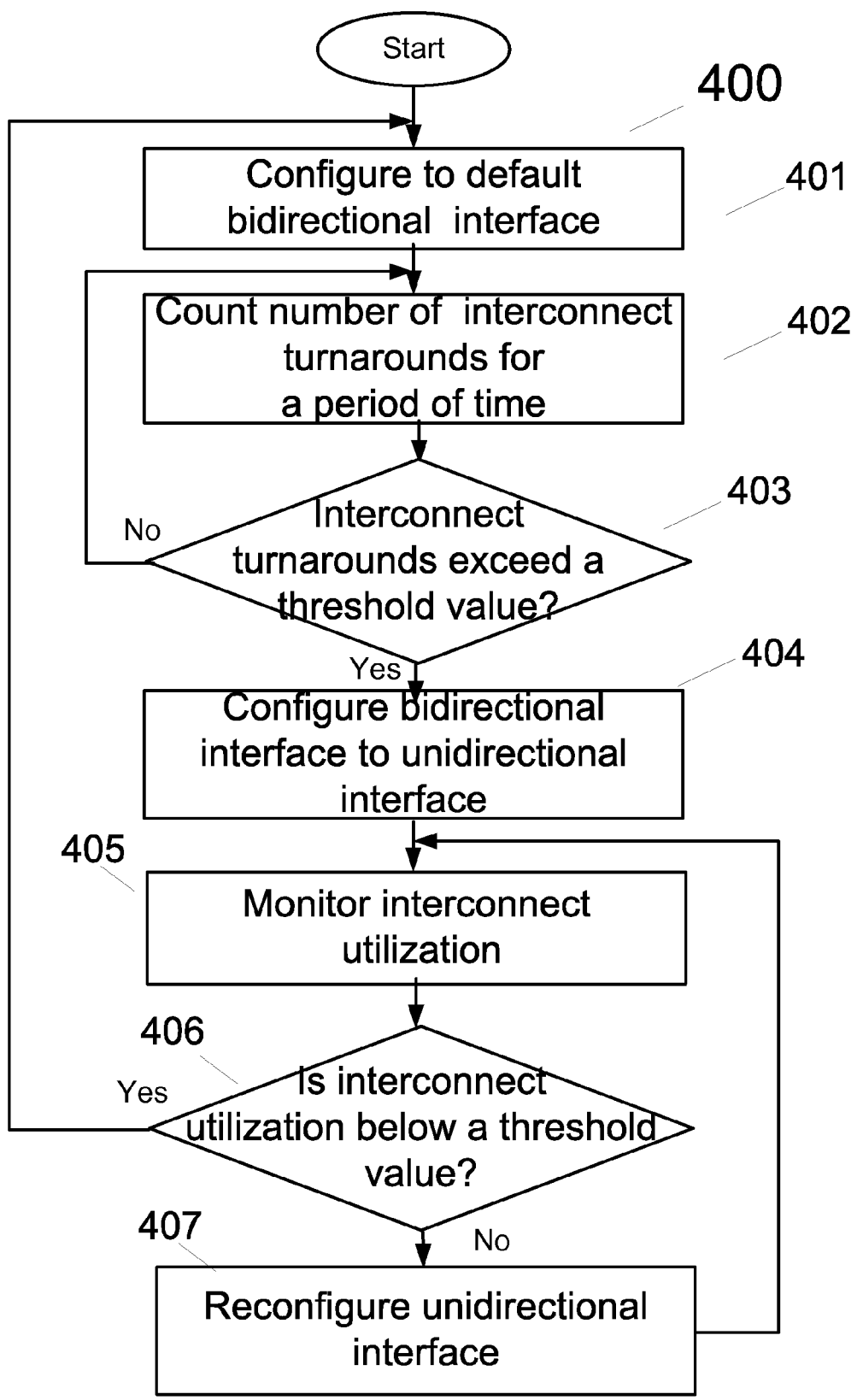
FIG. 4 is a flowchart of a Transmit-Receive Turnaround method 400 according to an embodiment of the present invention.

FIG. 4 illustrates a method 400 for configuring an interface of an electronic component based on the number of interconnect turnarounds in an embodiment of the present invention. In an embodiment of the present invention, a logic block or step illustrated in the methods describe herein represent a user selectable setting for configuring the interface at initialization, in normal operation, or both. In still another embodiment of the present invention, a logic block or step illustrated in the methods described herein represent an execution of a hardware operation. In an alternate embodiment of the present invention, a logic block represents an execution of a software component, such as a software program, a software object, a software function, a software subroutine, a software method, a software instance, a code fragment, singly or in combination. In still a further embodiment of the present invention, a logic block represents a software operation, hardware operation, user operation, singly or in combination. In alternate embodiments of the present invention, fewer or more logic blocks are carried out in methods described herein.

FIG. 4 initiates, as illustrated by logic block 401, configuring a bidirectional interface as a default setting at power up or initialization. Interconnect turnarounds are counted for a period of time as shown by logic block 402. An interconnect turnaround is defined as when transceivers 115*a-n* and 125*a-n* transition between transmitting electrical signals and receiving electrical signals. In an embodiment of the present invention, control signals 133 and 134 from transceivers 115*a-n* and 125*a-n* provide the number of interconnect turnarounds to T/R Turnaround Profile logic 304. A determination is made, as shown by logic block 403, whether the counted number of interconnect turnarounds exceeds a interconnect turnaround threshold value. In an embodiment of the present invention, a turnaround threshold value is stored in T/R Turnaround Profile logic 304. If the turnaround threshold value is exceeded, control transitions to logic block 404; otherwise, control transitions back to logic block 402. In an embodiment of the present invention, unanimity voting where the turnaround threshold value is exceeded several times in logic block 402 over a specified time period before control transitions to logic block 404. In logic block 404, a bidirectional interface is configured to the unidirectional interface. A predetermined number of transceivers in a bidirectional mode of operation are configured to a unidirectional transmit mode of operation and a predetermined number of bidirectional transceivers are configured to a unidirectional receive mode of operation. In a best mode embodiment of the present invention, all n transceivers are configured to a bidirectional mode of operation in logic block 401 and in logic block 404 either 1) n/2 transceivers are configured to a unidirectional transmit mode of operation and n/2 transceivers are configured to a unidirectional receive mode of operation or 2) 3n/4 transceivers are configured to a unidirectional transmit mode of operation and n/4 transceivers are configured to a unidirectional receive mode of operation. In logic block 405, interconnect 140 utilization is monitored. A determination is made, as shown by logic block 406, whether interconnect 140 utilization drops below a utilization threshold value. In an embodiment of the present invention, a utilization threshold value is stored in T/R Profile logic 301. If interconnect 140 utilization drops below the interconnect threshold value, control transitions back to logic block 401 where the unidirectional interface is configured back to a bidirectional interface; otherwise, control transitions to logic block 407 which reconfigures the transceivers that are in a unidirectional mode of operation in a best mode embodiment of the present invention. During reconfiguration, the number of transceivers either only transmitting or only receiving is reallocated. Control then transitions to logic block 405. In alternate embodiments of the present invention, an average burst length is monitored and compared to a burst length threshold value.

Figure 5:
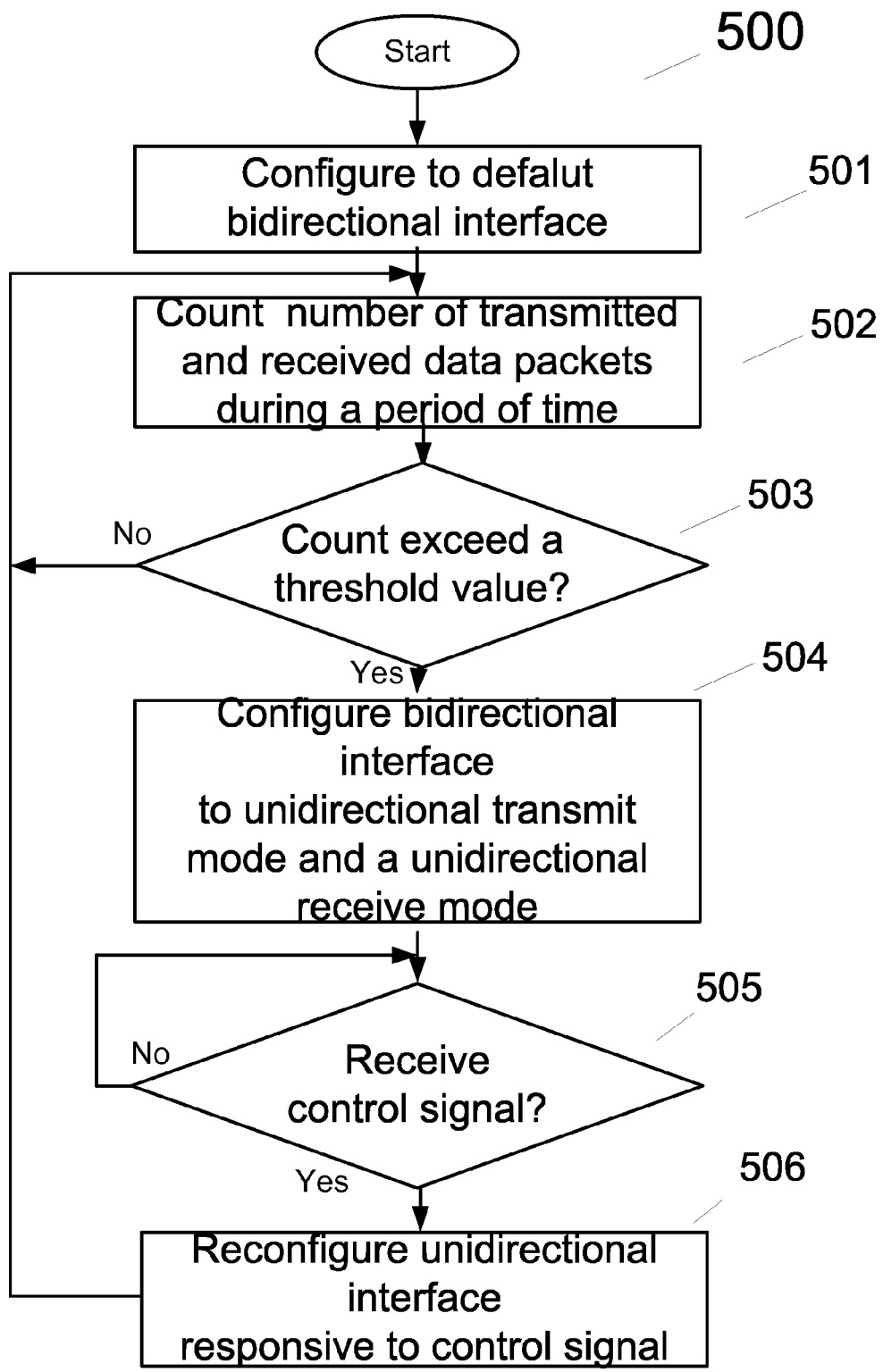
FIG. 5 is a flowchart of a Transmit-Receive method 500 according to an embodiment of the present invention.

FIG. 5 illustrates a method 500 for configuring an interface responsive to an absolute number of transmitted and received data packets by an electronic component or a ratio of transmit-to-receive data packets transmitted or received by an electronic component according to an embodiment of the present invention. FIG. 5 initiates, as illustrated by logic block 501, configuring to bidirectional interface as a default setting at power up or initialization. Transmitted and received data packets are counted for a period of time as shown by logic block 502. In an embodiment of the present invention, control signals 133 and 134 from transceivers 115*a-n* and 125*a-n* provide the number of transmitted and received data packets to T/R Profile logic 301. A determination is made, as shown by logic block 503, whether the counted number of transmitted and received data packets or a ratio thereof exceeds a T/R threshold value. In an embodiment of the present invention, a T/R threshold value is stored in T/R Profile logic 301. If the T/R threshold value is exceeded, control transitions to logic block 504; otherwise, control transitions back to logic block 502. In logic block 504, the bidirectional interface is configured to a unidirectional interface. A predetermined number of transceivers are configured to a unidirectional transmit mode of operation and a predetermined number of transceivers are configured to a unidirectional receive mode of operation. In logic block 505, a determination is made whether a control signal is received indicating a state of a particular system parameter. As described below, a control signal may indicate a requested bandwidth from an electronic component or application software program. In an alternate embodiment, the control signal indicates a read/write column operation or an Address/Data strobe ("ADS") in combination with a host request command. If a control signal is received, control transitions back to logic block 502; otherwise, control transitions to logic block 506 where an interface is further reconfigured. For example, an interface may have been configured to n/2 unidirectional transmit modes of operation and n/2 unidirectional receive modes of operation in logic block 504. An interface may then be reconfigured to n/4 unidirectional receive modes of operation and 3n/4 unidirectional transmit modes of operation based on a control signal indicating that the electronic component will be transmitting a large amount of data shortly. In another embodiment of the present invention, the control signal in logic 505 is responsive to a predetermined threshold values of interconnect utilization.

In another embodiment of the present invention, data packets having high priority are weighted. For applications were Quality of Service is important, an interface is configured in response to data packets with high priority in a transmit queue. Quality of Service refers to providing particular data packets higher priority than other data packets so that higher priority data packets can be processed more quickly. This preferential treatment is meant to lower the service time for these higher priority data packets.

An interface may be configured into an n unidirectional transmit mode to transmit the high priority data packets at a determined rate or time in order to have the high priority data packets processed as fast as possible.

In an alternate embodiment of the present invention, an interface is configured in response to a number of transmit and receive commands or a ratio thereof as described above in regard to data packets. In an alternate embodiment of the present invention, the number of transmit and receive commands are counted with commands having high priority data weighted.

Figure 6:
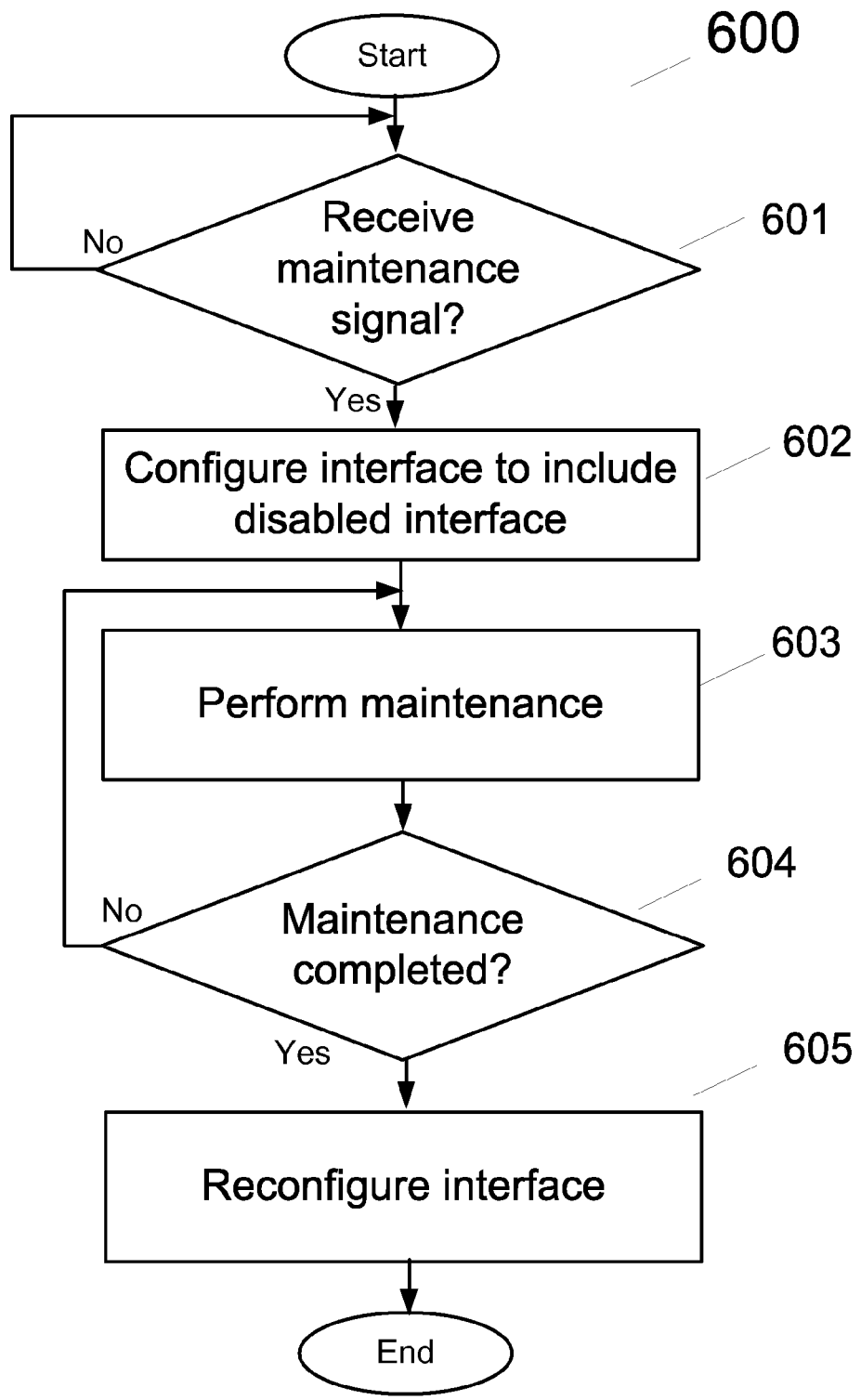
FIG. 6 is a flowchart of a Maintenance method 600 according to an embodiment of the present invention.

FIG. 6 illustrates a method 600 for configuring an interface during a maintenance or calibration mode in which some of the transceivers are disabled. In an embodiment of the present invention, Maintenance logic 302 performs this function responsive to a Maintenance signal 310. Method 600 initiates by determining if a Maintenance signal is received. If a Maintenance signal is received, control transitions to logic block 602; otherwise, control transitions back to logic block 601. An interface is then configured to a predetermined number of transceivers temporarily or permanently disabled in logic block 602. In an embodiment of the present invention, n/4 transceivers are configured to a unidirectional transmit mode of operation, n/2 are configured to a unidirectional receive mode of operation and n/4 are configured to a maintenance mode of operation or disabled. In another embodiment of the present invention, n/2 transceivers are in a bidirectional mode of operation and n/2 are in a maintenance mode of operation or disabled links. A maintenance operation is performed in logic block 603. In an embodiment of the present invention, a maintenance operation includes phase or impedance calibration as well as disabling based on signal or electronic component failure. In an embodiment of the present invention, electrical signals are transferred on interconnect that have not been disabled. A determination is made whether a maintenance mode of operation is completed in logic block 604. If a maintenance mode of operation is not completed, control passes back to logic block 603; otherwise, control transitions to logic block 605 were the interface is reconfigured to its prior configuration before the maintenance mode of operation. In an embodiment of the present invention, method 600 is repeated multiple times.

Figure 7:
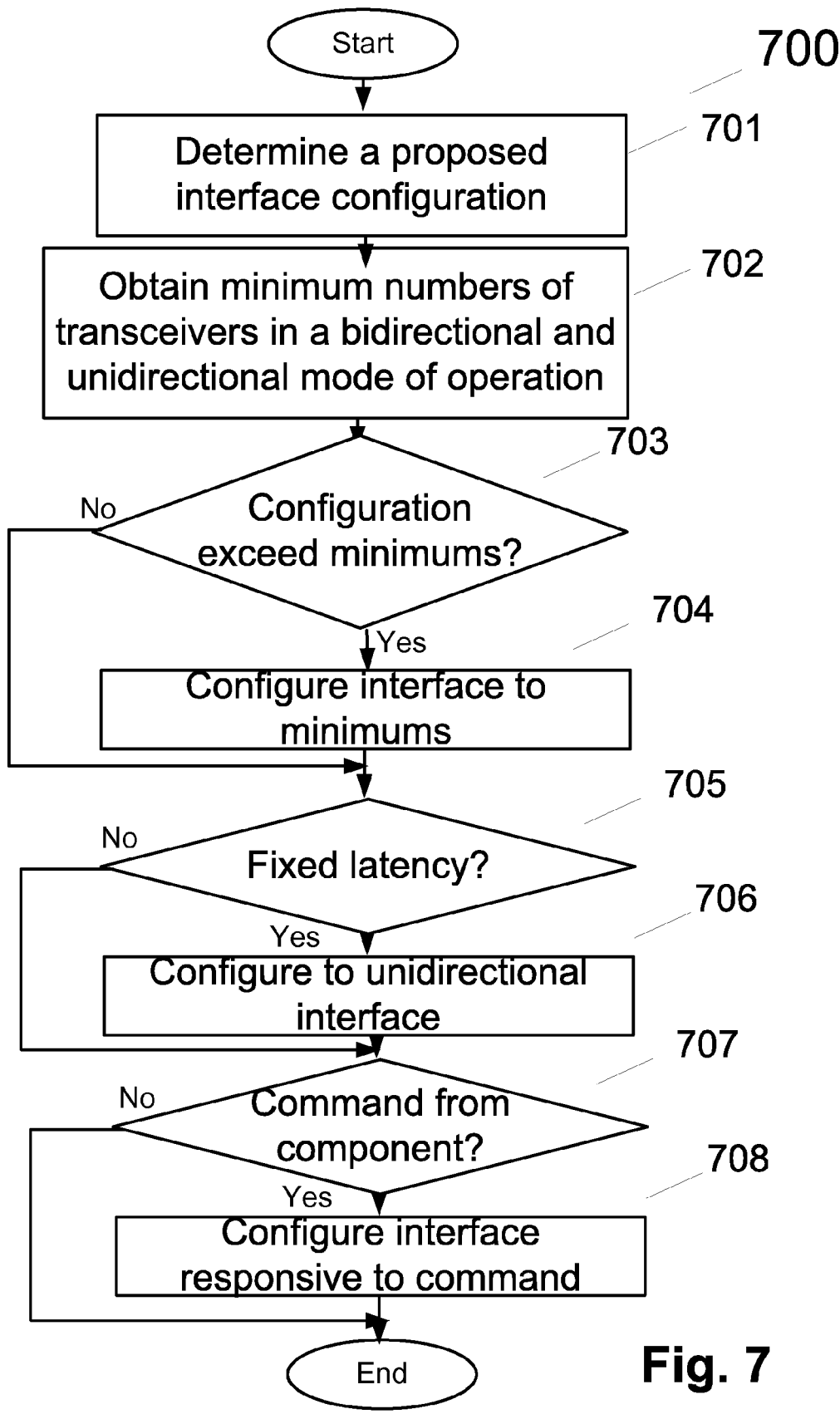
FIG. 7 is a flowchart of a Manual Override and Limits method 700 according to an embodiment of the present invention.

FIG. 7 illustrates a method 700 for configuring an interface responsive to manual overrides and limits. In an embodiment of the present invention, Manual Overrides and Limits logic 303 performs this function responsive to a Manual Overrides and Limits signal 320. Method 700 begins by determining a configuration of a bidirectional interface and/or unidirectional interface as illustrated by logic block 701. In an embodiment of the present invention, logic block 701 is performed by methods 400 or 500 as described above. In logic block 702, a minimum number of transceivers in a bidirectional mode of operation and unidirectional mode of operation is obtained. In an embodiment of the present invention, the minimum number of transceivers in respective modes is stored in Manual Overrides and Limits logic 303 or provided by Manual Overrides and Limits signal 320 from a master device or storage register. A determination is made whether the determined configuration exceeds configuration minimums in logic block 703. If configuration minimums are exceeded, minimum configurations are replaced with the proposed configuration as shown by logic block 704. For example, if logic block 701 determines that an interface should operate in a unidirectional transmit mode of operation and a minimum of at least one unidirectional receive mode of operation is a limit value or requirement, logic block 704 configures an interface to n-1 transceivers operating in a bidirectional mode of operation and 1 transceiver operating in a unidirectional receive mode of operation. In another embodiment of the present invention, the manual override may be set to absolute values as opposed to a minimum or maximum value. In logic block 705 a determination is made whether a fixed latency is required or whether unidirectional directionality is a limit value at all times to avoid interconnect turnaround and maintain deterministic latency. If fixed latency is not a limit value, control transitions to logic block 707; otherwise, control transitions to logic block 706 where a configuration determined by logic block 701 is overridden by configuration for a fixed latency limit value. In logic block 707 a determination is made whether a command for particular bandwidth by an electronic component is received. If an electronic component requests more read/write bandwidth, logic block 708 illustrates that an interface is configured as requested by the electronic component rather than as determined in logic block 701. Otherwise, method 700 ends. In an embodiment of the present invention, method 700 is repeated multiple times.

Figure 9:
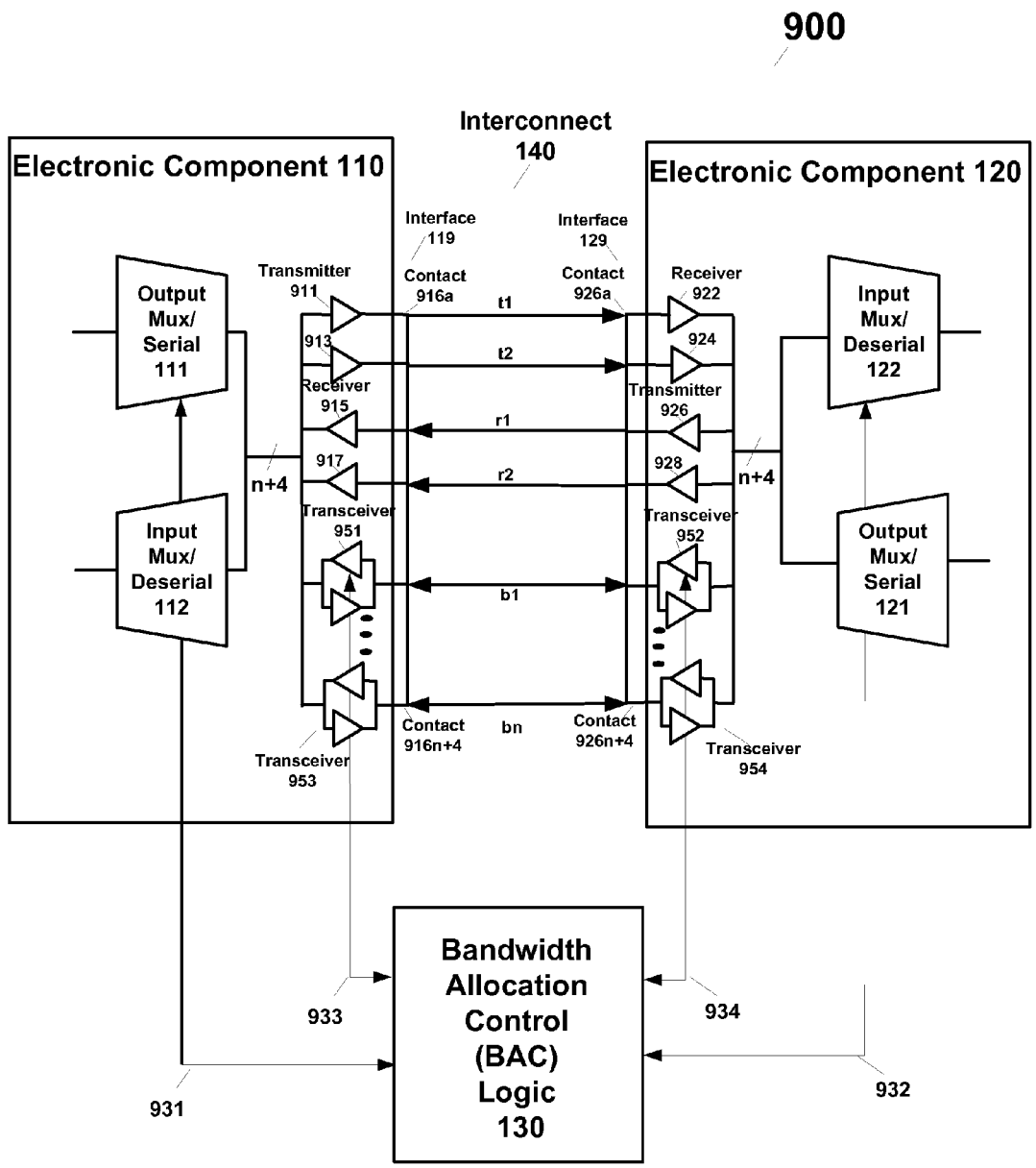
FIG. 9 illustrates an apparatus 100 including Bandwidth Allocation Control logic 130 and dedicated unidirectional interface according to an embodiment of the present invention.

In an alternate embodiment of the present invention, FIG. 9 illustrates an apparatus 900 having a combination of dedicated unidirectional transceivers that are not configurable and configurable transceivers that initially operate in a bidirectional mode of operation. This embodiment is preferred for applications that require low silicon area and low power consumption of the I/O interface, while still maintaining some workload flexibility. Interface 119 of electronic component 110 includes contacts 916a to 916n and electronic component 120 includes contacts 926a to 926n. Electronic component 110 includes dedicated unidirectional transceivers or transmitters 911 and 913 coupled to signal lines t1 and t2 as well as unidirectional transceivers or receivers 915 and 917 coupled to signal lines r1 and r2. Likewise, electronic component 120 includes dedicated unidirectional transceivers or receivers 922 and 924 coupled to signal lines t1 and t2 as well as unidirectional transceivers or transmitters 926 and 928 coupled to signal lines r1 and r2. Configurable transceivers 951 and 953 are coupled to configurable transceivers 952 and 954 by signal lines b1 and bn, respectively. BAC logic 130 configures the configurable transceivers to unidirectional mode of operation to allocate I/O bandwidth. For example, n/3 transceivers are in a dedicated receiver unidirectional mode of operation, n/3 transceivers are in a dedicated transmit mode of operation and n/3 transceivers are in bidirectional mode of operation that can be configured to either receive or transmit mode of operation. As a default or upon initialization, BAC logic 130 configures an interface, and in particular n/3 transceivers in a bidirectional mode of operation. BAC logic 130 then configures an interface in response to system parameters to configure an interface to range from n/3 transceivers transmitting and 2n/3 transceivers receiving to 2n/3 transceivers transmitting and n/3 transceivers receiving.

Figure 8:
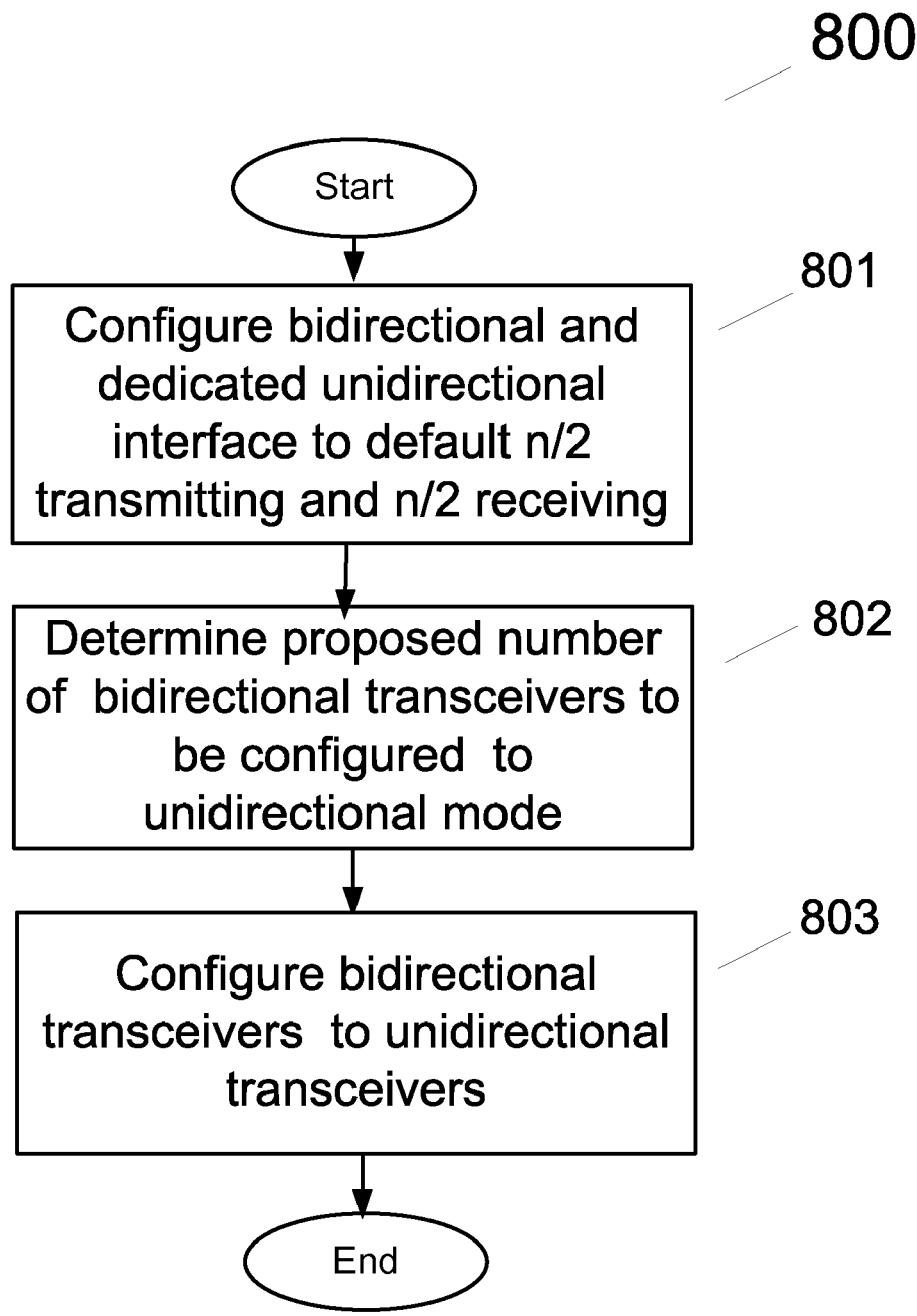
FIG. 8 is a flowchart of a configuring interface method 800 according to an embodiment of the present invention.

FIG. 8 illustrates a method 800 for configuring transceivers in a bidirectional mode of operation in an interface coupled to dedicated unidirectional transceivers. Method 800 initiates in logic block 801 by setting the transceivers in a bidirectional operation to half transmitting and half are receiving so that an interface has a default configuration of n/2 transceivers transmitting (including dedicated unidirectional transceivers transmitting and configured bidirectional transceivers to transmitting) and n/2 transceivers receiving (including dedicated unidirectional transceivers and configured bidirectional transceivers to receiving). A determination is made of the intended configuration of interface as seen in logic block 802. In an embodiment of the present invention, methods 400 or 500 are used to determine an intended configuration of interface in logic block 802. The appropriate number of transceivers in a bidirectional mode of operation is then configured in logic block 803 and method 800 ends. In an embodiment of the present invention, the number of transceivers to be configured is incremented linearly by granularities of one or in granularities of a binary series. In still another embodiment of the present invention, method 800 is repeated multiple times.

Figure 10:
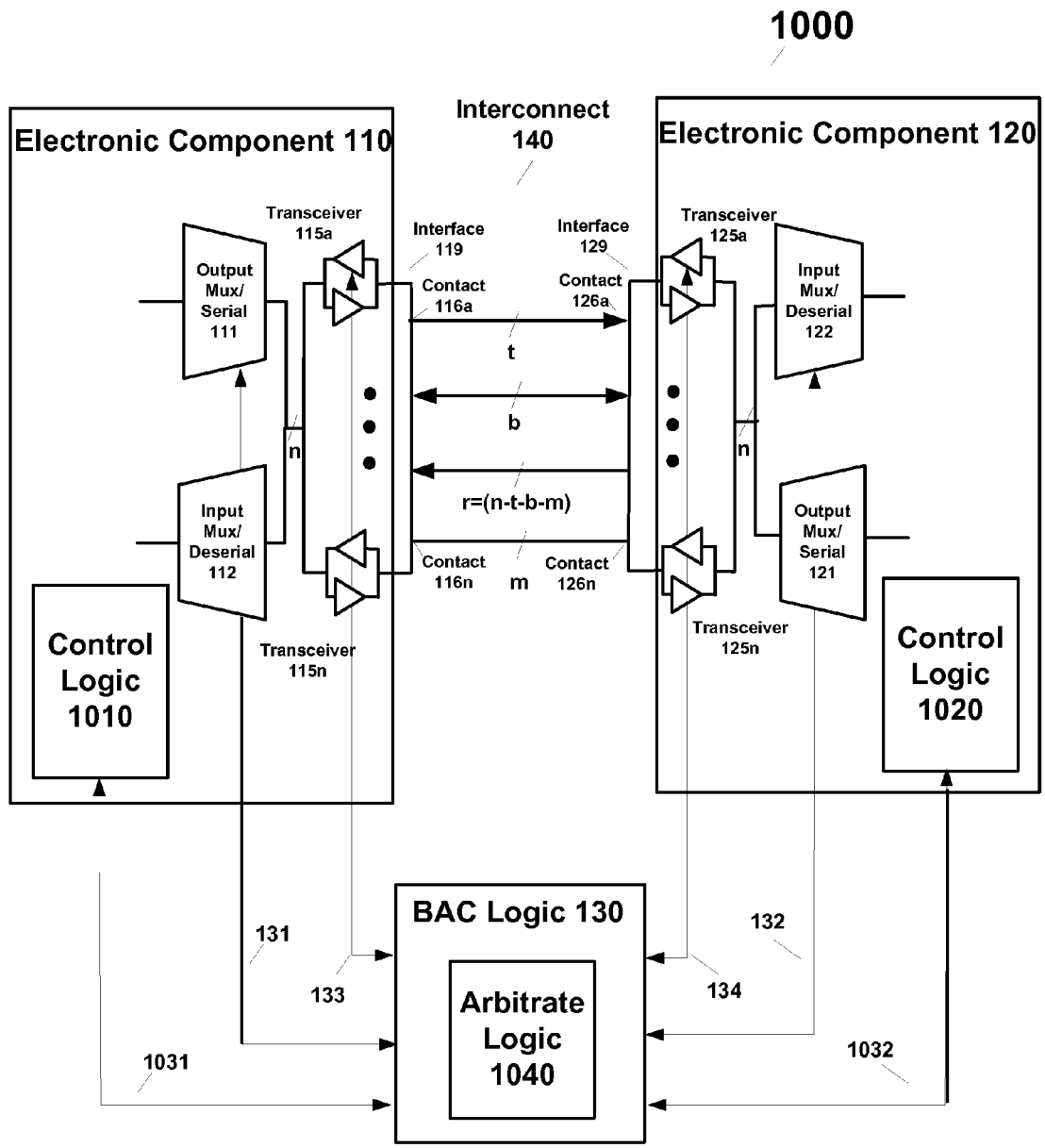
FIG. 10 illustrates an apparatus 1000 including IC Arbitrate logic 1040 according to an embodiment of the present invention.

FIG. 10 illustrates an apparatus 1000 including IC Arbitrate logic 1040 in BAC logic 130 for configuring an interface responsive to a Bandwidth Request control signal in an embodiment of the present invention. Apparatus 1000 includes like referenced elements shown in FIG. 1 that operate similarly and are described above. However, BAC logic 130 includes Arbitrate logic 1040 and Control logic 1010 and 1020 in respective electronic components 110 and 120, singly or in combination, in embodiments of the present invention. Control logic 1010 and 1020 generate I/O bandwidth request control signals 1031 and 1032 to BAC logic 130 based on expected IC interface requirements. In an embodiment of the present invention, BAC logic 130 configures interconnect 140 responsive to I/O bandwidth request control signals 1031 and 1032, singly or in combination. Arbitrate logic 1040 resolves conflicts if both I/O bandwidth request signals are received. For example, Arbitrate logic 1040 includes a priority list of connected electronic components and grants the I/O bandwidth request from the highest priority electronic component and ignores the other request during a period of time in an embodiment of the present invention. In an alternate embodiment of the present invention, Arbitrate logic 1040 alternates granting I/O bandwidth requests from respective electronic components. Control logic 1010 and 1020 are processing units executing machine-readable instructions, such as firmware, general-purpose processors, combinatorial and sequential logic, operating system or high-level software in embodiments of the present invention.

Figure 15:
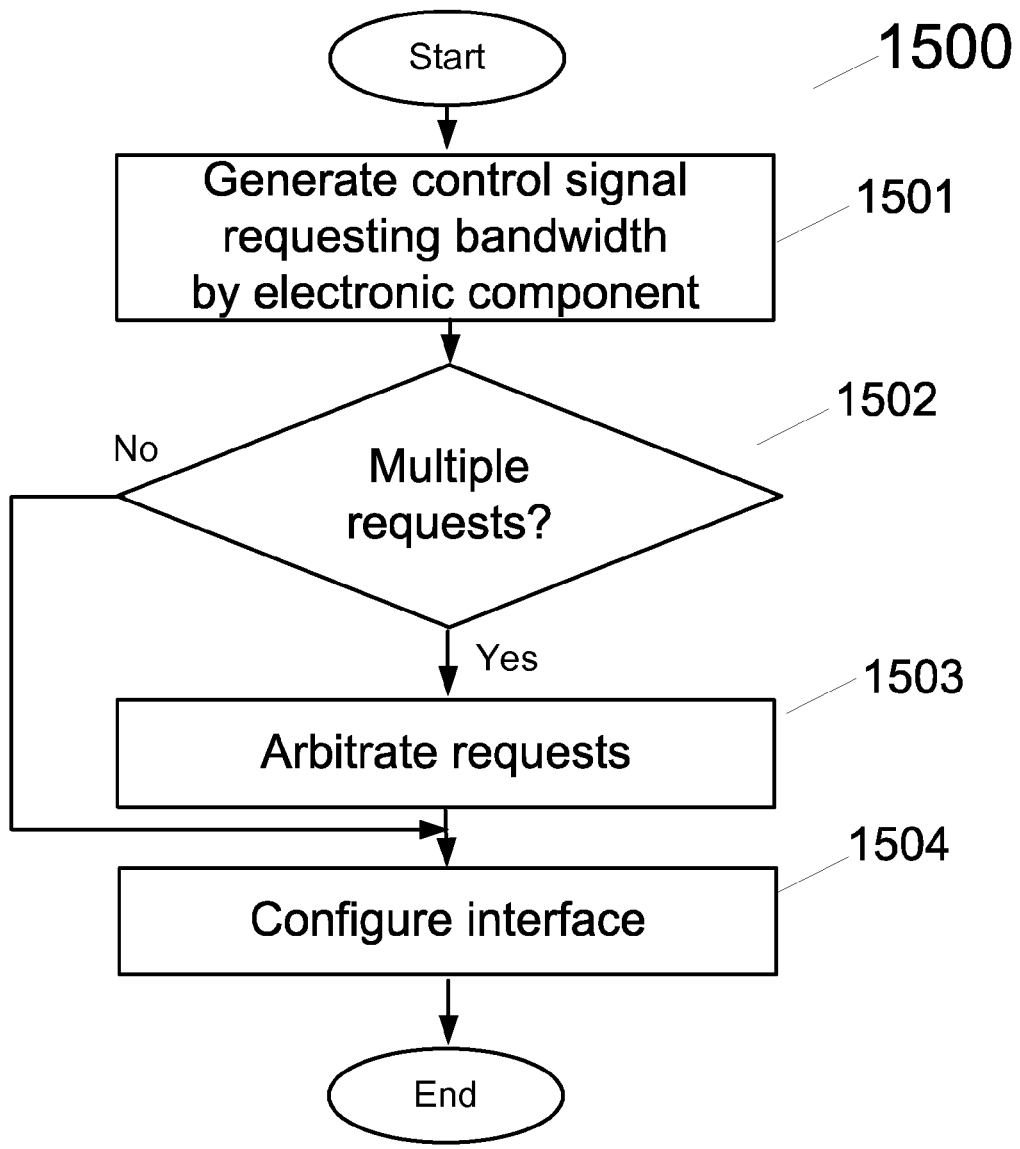
FIG. 15 illustrates an IC Request method 1500 according to an embodiment of the present invention.

FIG. 15 illustrates a method 1500 for performing the functions of Arbitrate logic 1040, control logic 1010 and 1020 in an embodiment of the present invention. Method 1500 initiates by generating an electronic component generating a control signal indicating a requested I/O bandwidth as shown by logic block 1501. For example, Control logic 1020 generates a control signal 1032 to Arbitrate logic 1040 requesting all transceivers transmitting. A determination is made whether multiple I/O bandwidth requests have been received from respective electronic components as illustrated by logic block 1502. In an embodiment of the present invention, Arbitrate logic 1040 determines if multiple I/O bandwidth requests have been received. If multiple I/O bandwidth requests have not been received within a period of time, control transitions to logic block 1504 where an interface is configured as indicated by the I/O bandwidth request control signal and method 1500 ends. If multiple I/O bandwidth request control signals are received within a period of time, the requests are arbitrated as shown by logic block 1503. In an embodiment of the present invention, method 1500 is repeated multiple times. In embodiments of the present invention, Arbitrate logic 1040 arbitrates I/O bandwidth request control signals as described above.

Figure 11:
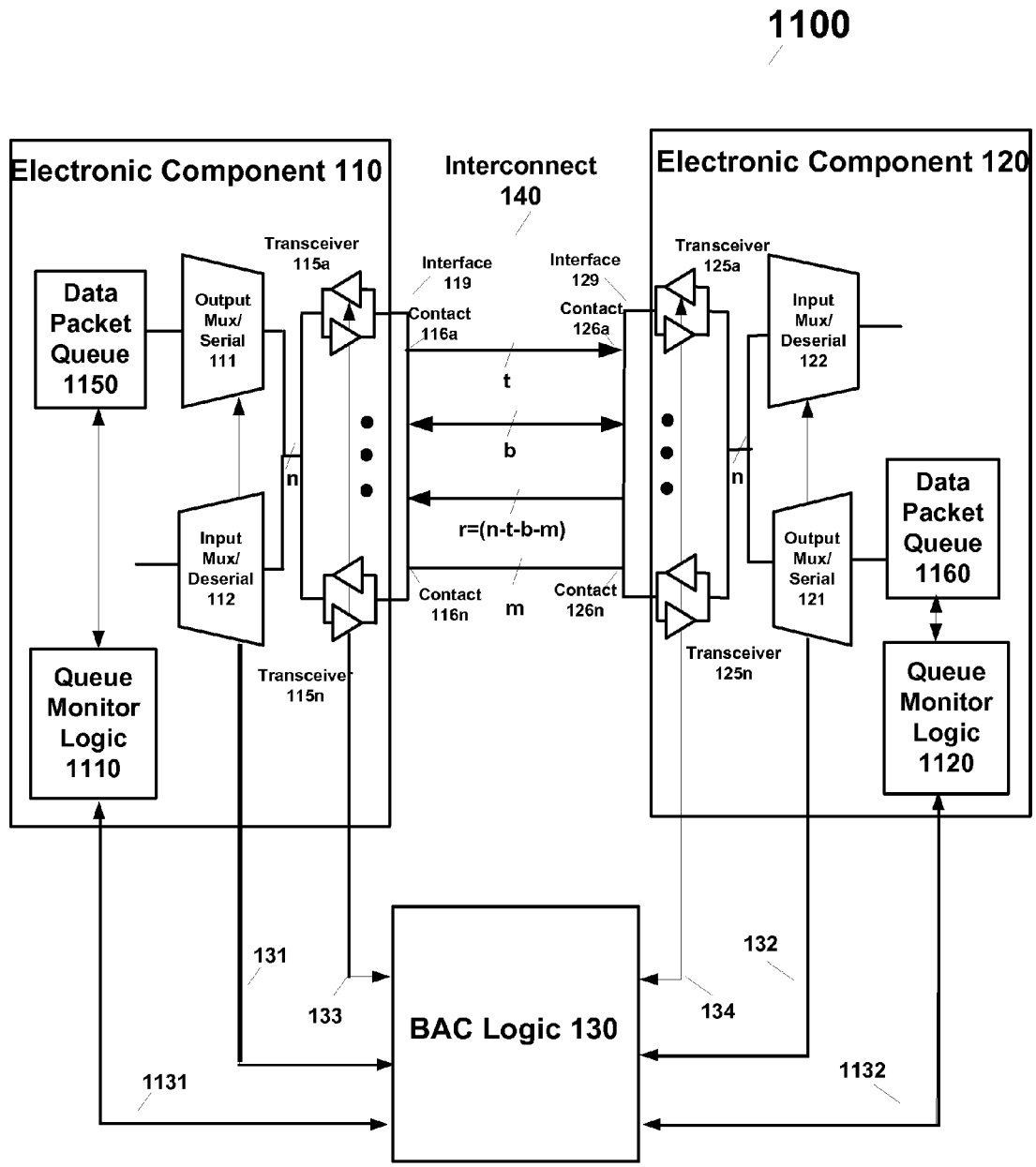
FIG. 11 illustrates an apparatus 1100 including Queue Monitor logic 1110 according to an embodiment of the present invention.

FIG. 11 illustrates an apparatus 1100 including Data Packet queues 1150 and 1160, and Queue Monitor logic 1110 and 1120, in respective electronic components 110 and 120, singly or in combination, in embodiments of the present invention. Queue Monitor logic 1110 and 1120 generate control signals 1131 and 1132 to BAC logic 130 responsive to the number of data packets queued to be transmitted on interconnect 140 or the average time a data packet is stored in Data Packet queues 1150 and 1160, respectively. Apparatus 1100 includes like referenced elements shown in FIG. 1 that operate similarly and are described above. However, BAC logic 130 configures an interface responsive to control signals 1131 and 1132 generated in response to a number of queued data packets or average wait time of a data packet to be transmitted.

Figure 16:
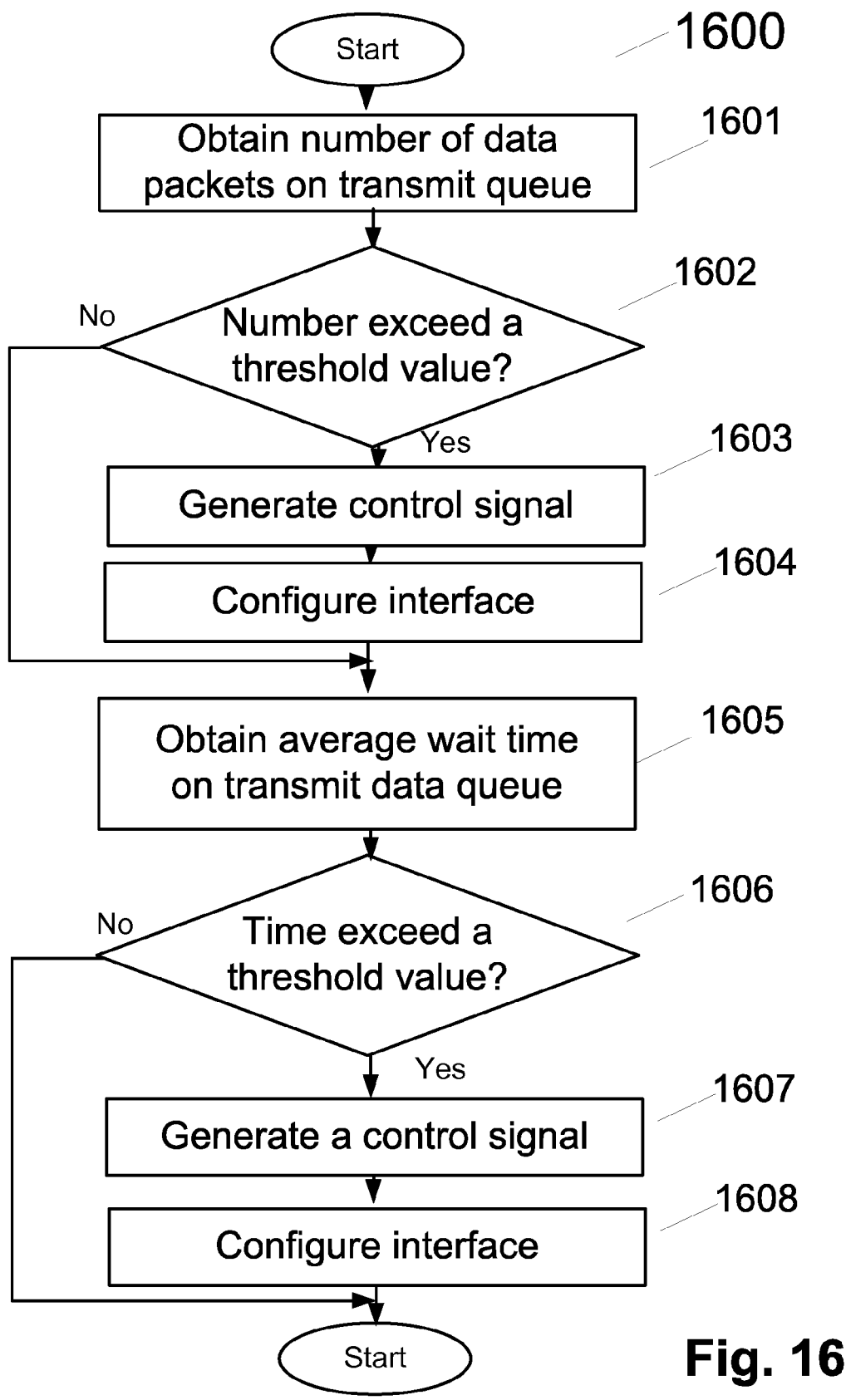
FIG. 16 illustrates a Queue Monitor method 1600 according to an embodiment of the present invention.

FIG. 16 illustrates a method 1600 for configuring an interface responsive to a number of data packets queued to be transmitted on interconnect 140 or an average wait time of a data packet stored on a queue. Method 1600 initiates by obtaining the number of data packets waiting to be transmitted as shown by logic block 1601. A Data Packet threshold value is obtained and compared to the number of data packets waiting to be transmitted as shown in logic block 1602. In an embodiment of the present invention, Queue Monitor logic 1110 and 1120 store a Data Packet threshold value that may be identical or different values. If the number of waiting data packets exceed the Data Packet threshold value, control transitions to logic block 1605. Otherwise, a control signal is generated as shown by logic block 1603. In an embodiment of the present invention, Queue Monitor logic 1110 and 1120 generate control signals 1131 and 1132, respectively, to BAC logic 130. An interface is then configured by BAC logic 130 responsive to control signals 1131 and 1132 as shown by logic block 1604. An average wait time for transmitting a data packet is then obtained as illustrated by logic block 1605. Queue Monitor logic 1110 and 1120 obtain an average wait time for queued data packets on Data Packet queue 1150 and 1160, respectively. An Average Wait Time threshold value is then obtained and compared to the measured average wait time as shown by logic block 1606. In an embodiment of the present invention, Average Wait Time threshold values are stored in Queue Monitor logic 1110 and 1120, respectively. If the measured average wait time exceeds the Average Wait Time threshold value, control transitions to logic block 1607 where a control signal is generated as shown by logic block 1607. Control transitions to logic block 1608 where an interface is configured. In an embodiment of the present invention, Queue Monitor logic 1110 and 1120 generate control signals 1131 and 1132, respectively. The interface is then configured by BAC logic 130 responsive to control signals 1131 and 1132 as shown by logic block 1608 and method 1600 ends. In an embodiment of the present invention, method 1600 is repeated multiple times.

Method 1600 and apparatus 1100 reduce the depth of the transmit queue for waiting data packets. When Data Packet queue 1150 and 1160 fill up, this causes stalls in the transmitting electronic component, since there are no more queue entries to add new data packets to be transmitted. Monitoring the queue depth and ensuring that queues always have some unoccupied queue entries allows the electronic component to keep computing. Similarly, monitoring the amount of time a data packet waits on the queue is a measure of queue service time. Balancing queue service time in each electronic component can lead to increased performance by ensuring that transmitters flush queue entries in a timely fashion, and by ensuring that receivers get data in a timely fashion. In still another embodiment of the present invention, an interface is reconfigured responsive to the number of data packets waiting to be received or the amount of time before a data packet is received.

Figure 12:
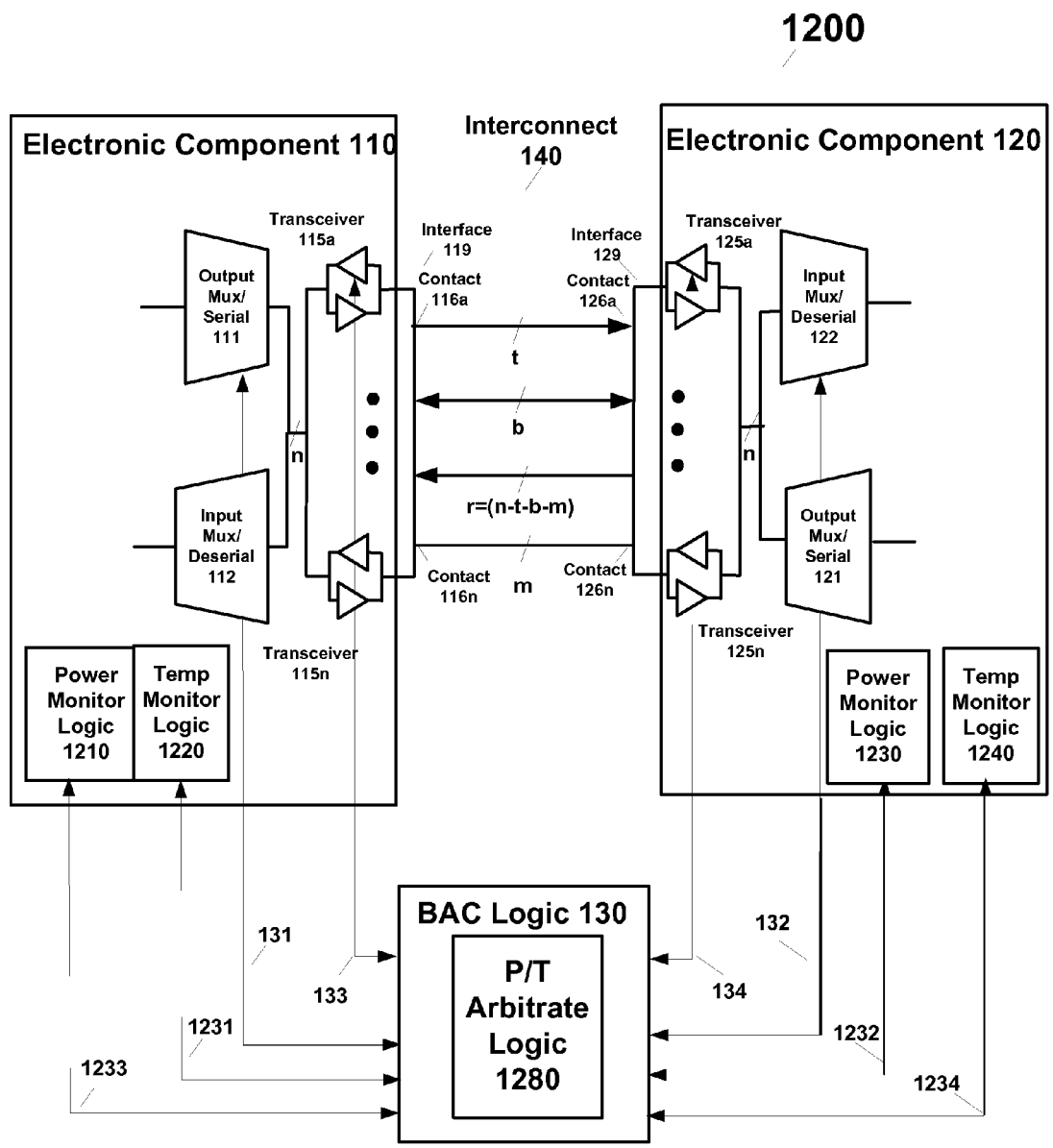
FIG. 12 illustrates an apparatus 1200 including IC Power and Temperature Arbitrate logic 1280 according to an embodiment of the present invention.

FIG. 12 illustrates an apparatus 1200 including Power Monitor logic 1210 and 1230, and Temperature ("Temp") Monitor logic 1220 and 1240, in respective electronic components 110 and 120, singly or in combination, and Power and Temperature ("P/T") Arbitrate logic 1280 in BAC logic 130 in an embodiment of the present invention. Temperature Monitor logic 1220 and 1240, and Power Monitor logic 1210 and 1230 may be integrated into electronic components 110 or 120 respectively or be coupled separately to components 110 or 120. Power Monitor logic 1210 and 1230 generate control signals 1233 and 1232 to BAC logic 130 responsive to power consumption of electronic components 110 and 120. Similarly, Temp Monitor logic 1220 and 1240 generate control signals 1231 and 1234 to BAC logic 130 responsive to temperature in electronic components 110 and 120. Apparatus 1200 includes like referenced elements shown in FIG. 1 that operate similarly and are described above. However, BAC logic 130, and in particular P/T Arbitrate logic 1280 configures an interface responsive to control signals 1231-1234 generated in response to temperature and power consumed by respective electronic components 110 and 120. In an embodiment of the present invention, Power Monitor logic 1210 and 1230 include power sensors for individual components in electronic component 110 and 120. For example, Power Monitor logic 1210 and 1230 monitor and record power consumption of electronic component transmitters and receivers during various states of operation. Likewise, Temp Monitor logic 1220 and 1240 include individual temperature sensors to monitor temperature of individual components, as well as overall electronic component temperature that may have different cooling dynamics in embodiments of the present invention. Accordingly, an interface can be configured in response to power consumption and temperature of electronic components 110 and 120 in order to schedule or prolong power sources, such as a battery. Similarly, an interface can also be configured in response to the temperature of electronic components 110 and 120 in order to reduce thermal effects on electronic components 110 and 120 that may reduce performance, reliability or cause failures. Different electronic components may have different cooling mechanisms and dynamically configuring an interface may reduce the likelihood that an electronic component will overheat causing signal, electronic component failure, or performance degradation.

Figure 17:
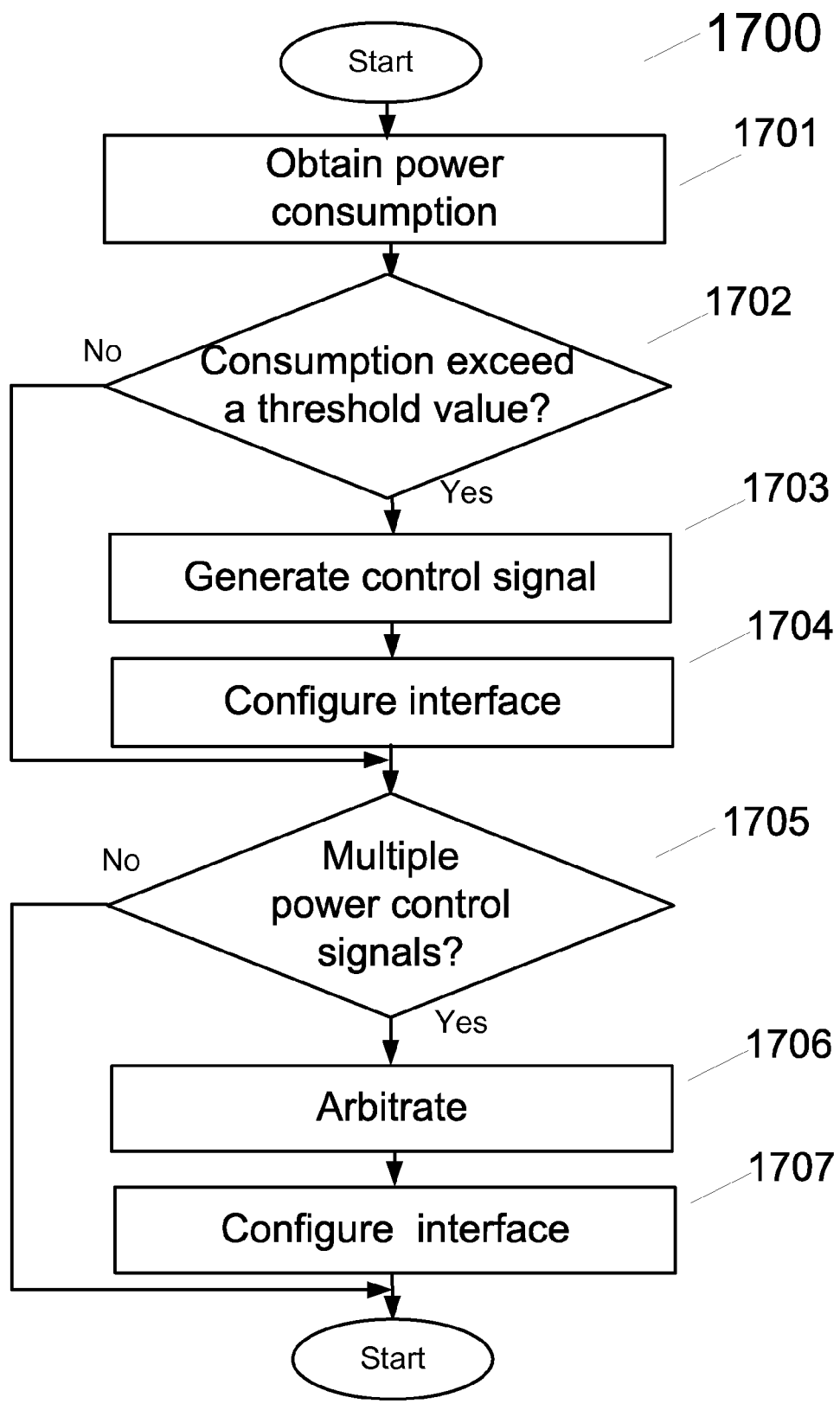
FIG. 17 illustrates an IC Power method 1700 according to an embodiment of the present invention.

FIG. 17 illustrates a method 1700 for configuring an interface responsive to power consumption. Method 1700 initiates power consumption from an electronic component as shown by logic block 1701. A Power Consumption threshold value is obtained and compared to the measured power consumption value as shown in logic block 1702. In an embodiment of the present invention, Power Monitor logic 1210 and 1230 store Power Consumption threshold values that may be identical or different respective values. In logic block 1703, a control signal is generated in response to the comparison. An interface is then configured responsive to the control signal as shown by logic block 1704. A determination is made in logic block 1705 whether multiple electronic components have generated power consumption control signals. If only a single power consumption control signal is received, method 1700 ends; otherwise, control transitions to logic block 1706 where multiple power consumption control signals from respective electronic components are arbitrated and an interface is configured responsive to the arbitration as seen by logic block 1707. In an embodiment of the present invention, method 1700 is repeated multiple times. In an embodiment of the present invention, the multiple power consumption control signals are arbitrated as described above in regard to FIG. 10.

Figure 18:
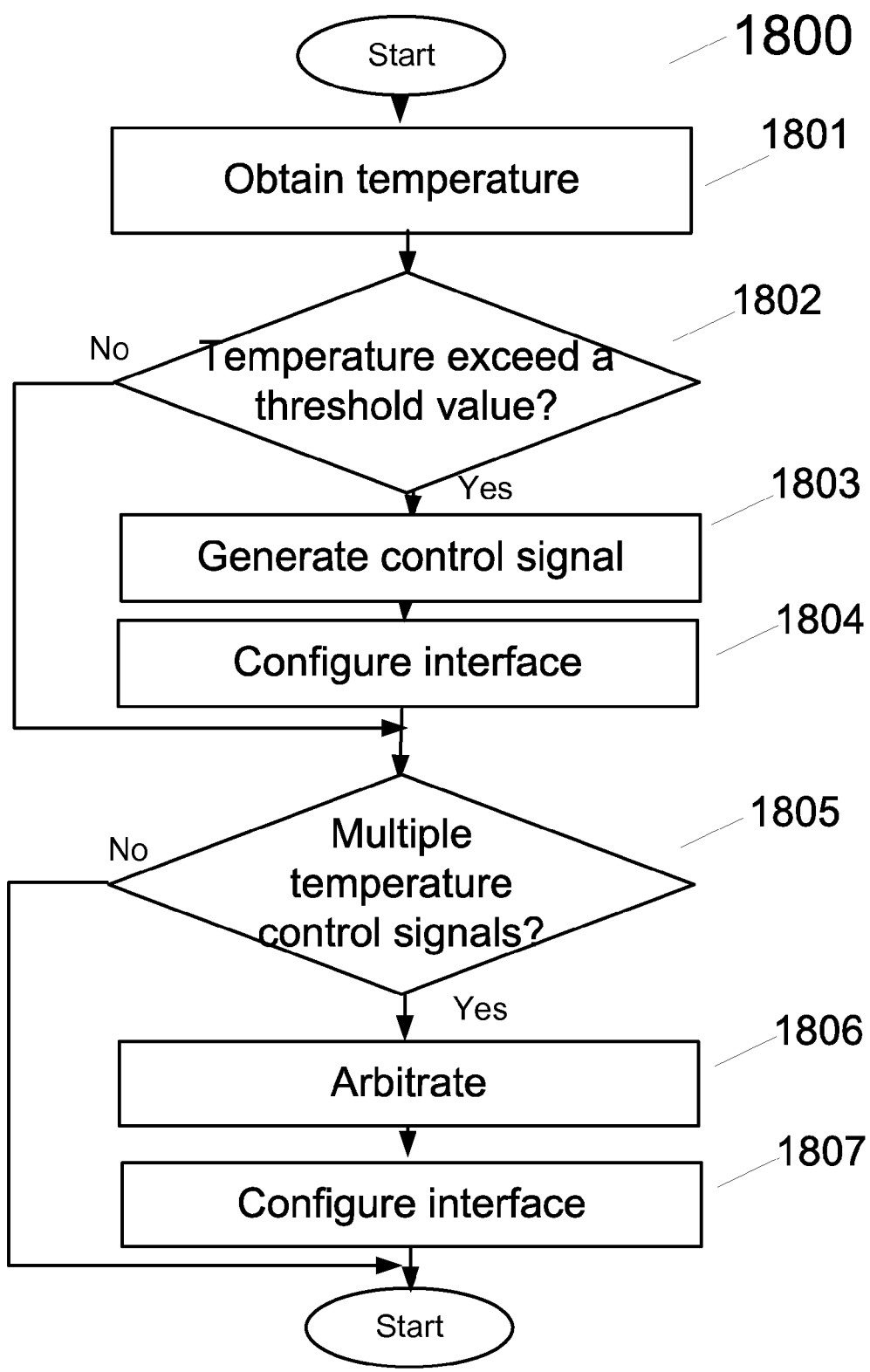
FIG. 18 illustrates an IC Power Dissipation method 1800 according to an embodiment of the present invention.

FIG. 18 illustrates a method 1800 for configuring an interface responsive to temperature. Method 1800 initiates by obtaining temperature from an electronic component as shown by logic block 1801. A temperature threshold value is obtained and compared to the measured temperature value as shown in logic block 1802. In an embodiment of the present invention, Temp Monitor logic 1220 and 1240 store Temperature threshold values that may be identical or different respective values. In logic block 1803, a control signal is generated in response to the comparison. An interface is then configured responsive to the control signal as shown by logic block 1804. A determination is made in logic block 1805 whether multiple electronic components have generated Temperature control signals. If only a single Temperature control signal is received, method 1800 ends; otherwise, control transitions to logic block 1806 where multiple temperature control signals from respective electronic components are arbitrated and an interface is configured responsive to the arbitration as seen by logic block 1807. In an embodiment of the present invention, method 1800 is repeated multiple times. In an embodiment of the present invention, the multiple temperature control signals are arbitrated as described above in regard to FIG. 10.

Figure 13:
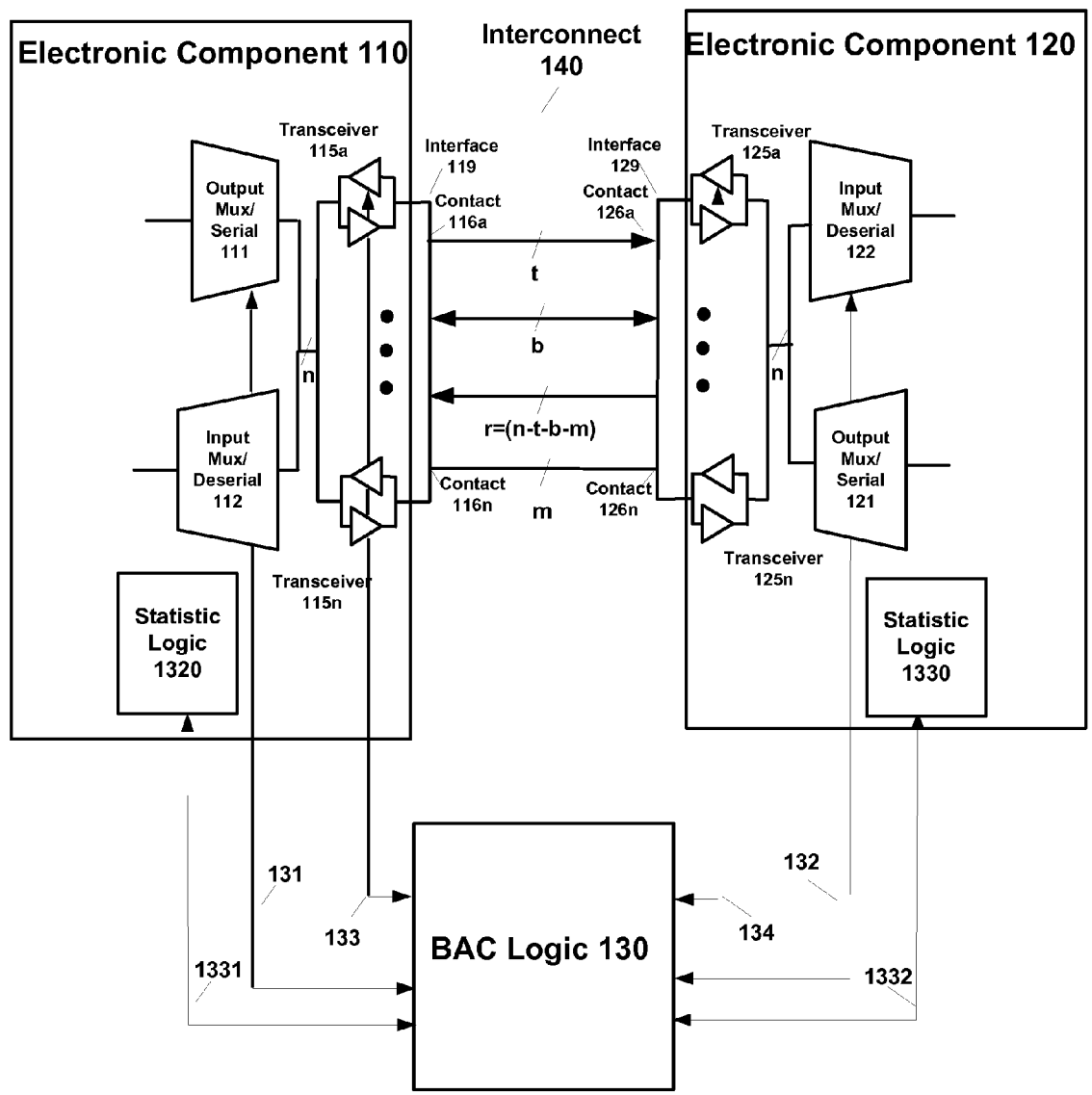
FIG. 13 illustrates an apparatus 1300 including Statistics logic 1320 and 1330 according to an embodiment of the present invention.

FIG. 13 illustrates an apparatus 1300 including Statistics logic 1320 and 1330 in respective electronic components 110 and 120, singly or in combination, in embodiments of the present invention. Statistics logic 1320 and 1330 generate control signals 1331 and 1332 to BAC logic 130 responsive to statistics. In another embodiment of the present invention, Statistic logic 1320 or 1330 may be in either electronic components 110, 120 or in software code. Apparatus 1300 includes like referenced elements shown in FIG. 1 that operate similarly and are described above. However, BAC logic 130 configures an interface responsive to control signals 131-134 and control signals 1331 and 1332 generated by statistics obtained by respective electronic components 110 and 120. In an embodiment of the present invention, Statistics logic 1320 and 1330 obtain statistics over a period of time to determine if using different allocation of bandwidth or different interface configurations would result in better performance. For example, Statistics logic 1320 and 1330 include equations that relate performance metrics, like bandwidth utilization and/or service time to various configurations (all unidirectional, all bidirectional, a mix of unidirectional and bidirectional). Using statistics obtained over previous periods of time under similar operating conditions, optimal bandwidth allocations or configurations can be determined.

Figure 19:
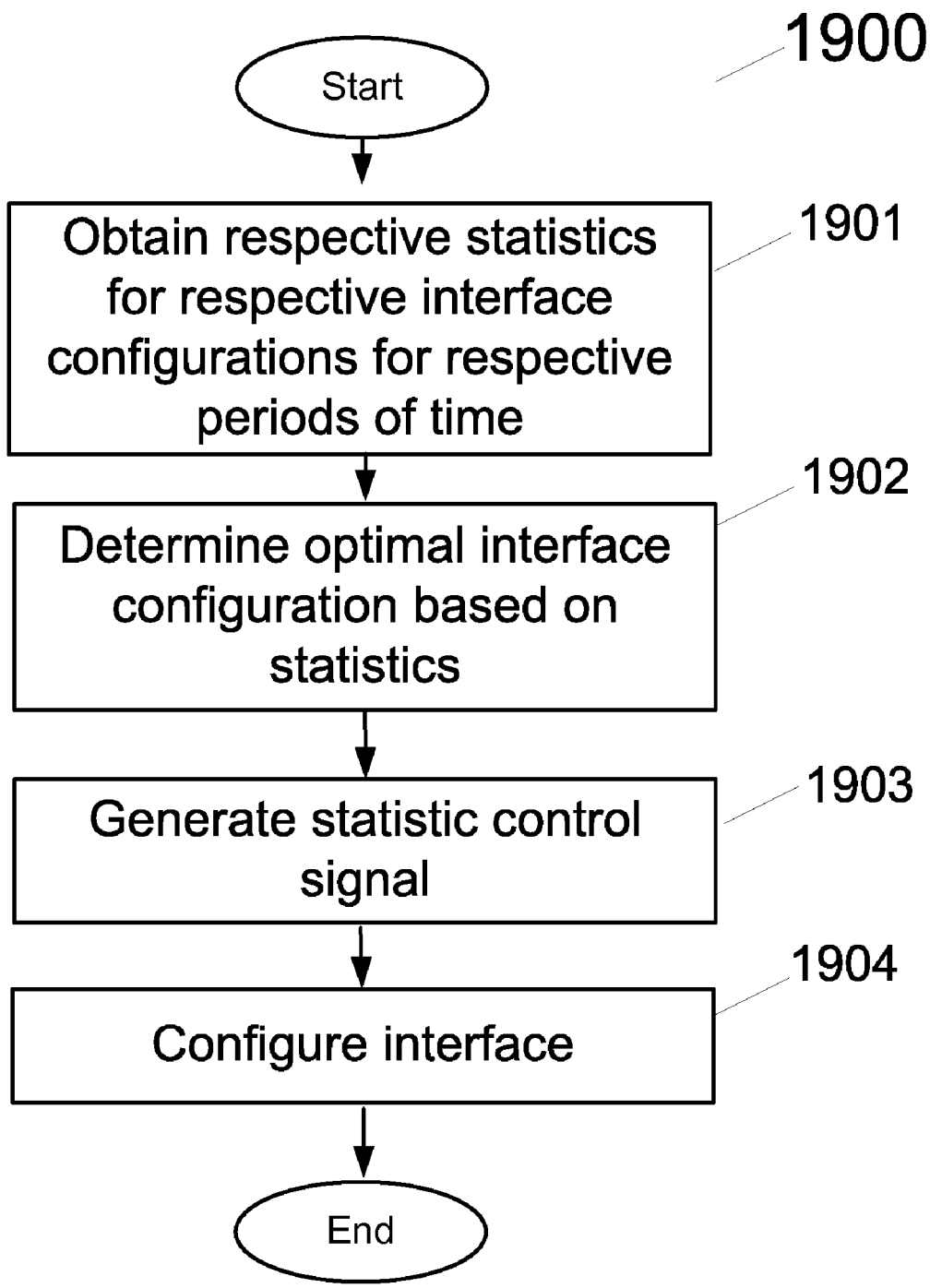
FIG. 19 illustrates a Statistics method 1900 according to an embodiment of the present invention.

FIG. 19 illustrates a method 1900 for configuring an interface responsive to statistics. Method 1900 initiates by obtaining multiple statistics for respective interface configurations over respective periods of time as seen by logic block 1901. For example, configurations for transferring data during respective executions of a game software application are stored along with respective transfer times for transferring the data. Logic block 1902 then determines an optimal interface configuration based on a single or multiple statistics, such as the least amount of time for transferring data during the execution of a game software application. In an embodiment of the present invention, Statistics logic 1320 and 1330 perform the function of measuring and calculating various statistics and storing corresponding respective interface configurations. A Statistics control signal, such as control signals 1331 and 1332, containing the optimal interface configuration is then generated as shown by logic block 1903. An interface is then configured responsive to the Statistics control signals as shown by logic block 1904 and method 1900 ends. In another embodiment of the present invention, method 1900 may be repeated singly or numerous times.

Figure 14:
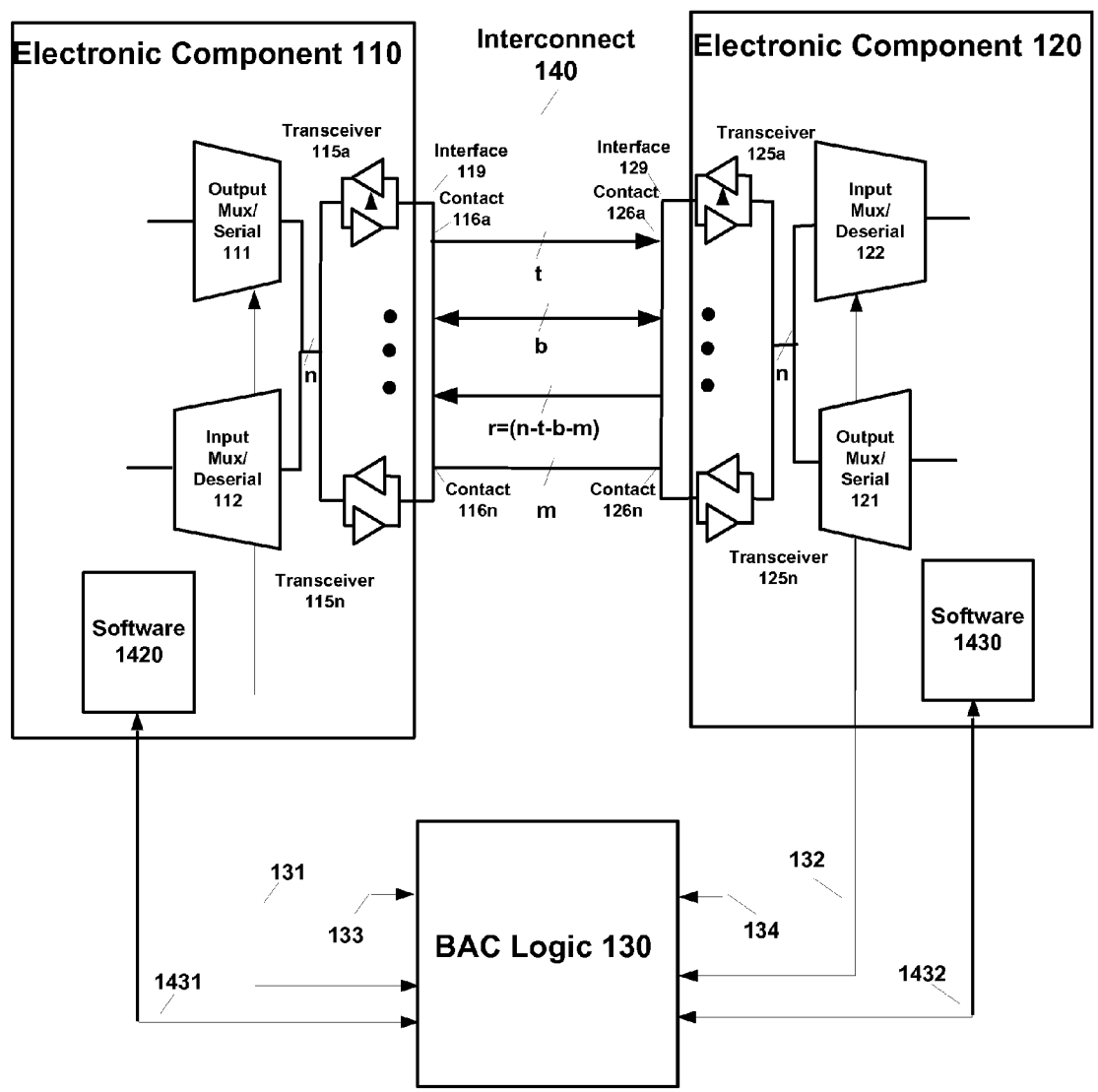
FIG. 14 illustrates an apparatus 1400 including software component 1420 and 1430 according to an embodiment of the present invention.

FIG. 14 illustrates an apparatus 1400 including Software component 1420 and 1430 in respective electronic components 110 and 120, singly or in combination, in embodiments of the present invention. Software components 1420 and 1430 are executable machine-readable instructions, such as firmware, application software or an operating system. In embodiments of the present invention, software components include a software program, a software object, a software function, a software subroutine, a software method, a software instance, a code fragment, singly or in combination. Software components 1430 and 1420 generate control signals 1431 and 1432 to BAC logic 130 responsive to events, states or execution of instructions in software components 1430 and 1420. For example, software component 1430 is a game software application that generates a request, or control signal 1432, for a particular interface configuration during the execution of a particular instruction code segment. Apparatus 1400 includes like referenced elements shown in FIG. 1 that operate similarly and are described above.

Figure 20:
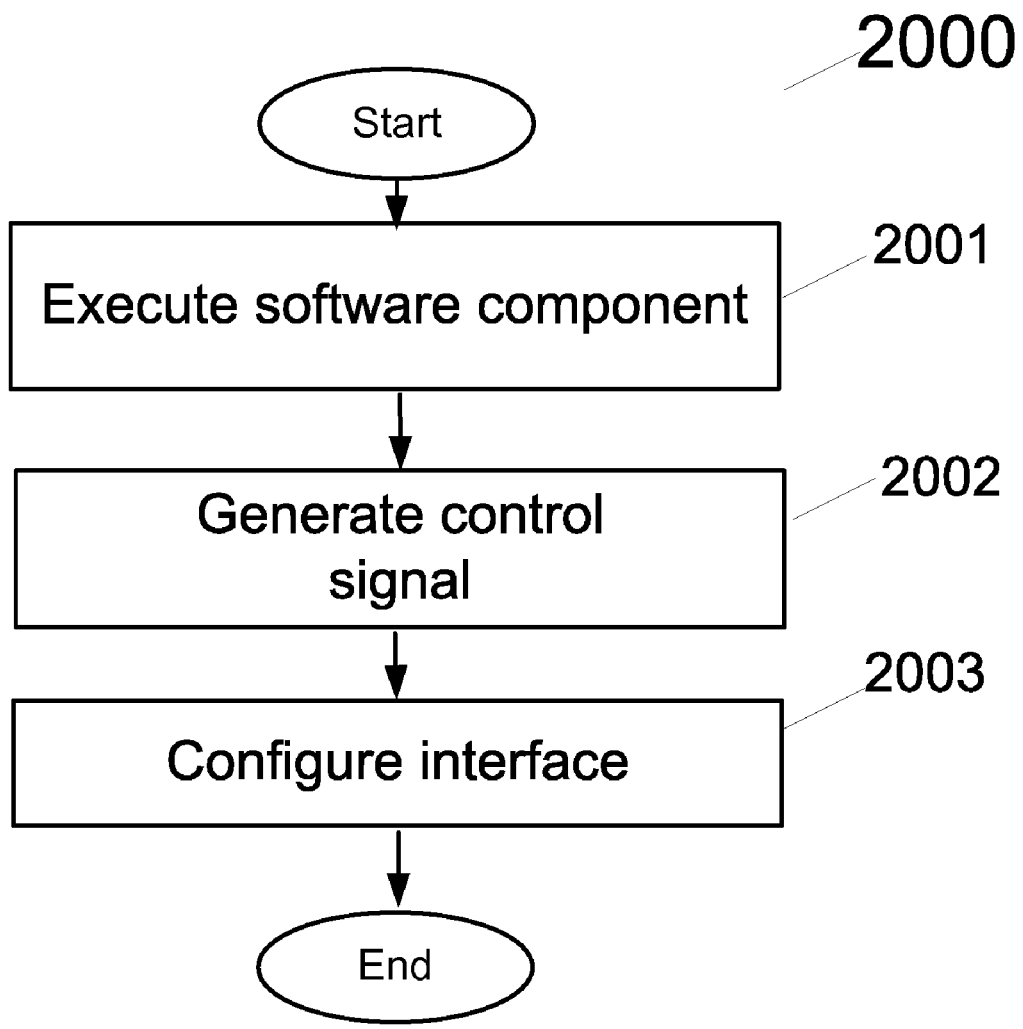
FIG. 20 illustrates a method 2000 according to an embodiment of the present invention.

FIG. 20 illustrates a method 2000 for configuring an interface responsive to software. Method 2000 initiates by executing a software component, such as a game application software program as illustrated by logic block 2001. A software component then generates a control signal responsive to the execution of the software component as seen by logic block 2002. In an embodiment of the present invention, the control signal requests a particular configuration or indicates a state or upcoming state of an electronic component, such as transmit state. An interface is configured responsive to the control signal as shown by logic block 2003 and method 2000 ends. In an embodiment of the present invention, method 2000 is repeated multiple times.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
a first integrated circuit having a first interface coupled to a first signal path, the first interface having a first plurality of contacts;
a second integrated circuit having a second interface coupled to the first signal path, the second interface having a second plurality of contacts;
wherein the first and second integrated circuits are operable in a first and second mode of operation, wherein:
during the first mode of operation, the first integrated circuit configures a first set of contacts in the first plurality of contacts to output and receive signals, the second integrated circuit configures a second set of contacts in the second plurality of contacts to output and receive signals to and from the first set of contacts, the first and second integrated circuits configure the first and second sets of contacts in response to a control signal; and
during the second mode of operation, the first integrated circuit configures a third set of contacts in the first plurality of contacts to output signals, the second integrated circuit configures a fourth set of contacts in the second plurality of contacts to receive the signals from the third set of contacts; and
a control circuit to output the control signal;
wherein the control signal is output in response to an indication as to a number of transmit commands.

2. The system of claim 1, wherein the indication includes a request for bandwidth.

3. The system of claim 1, wherein the control circuit includes a register to output the control signal.

4. The system of claim 1, wherein the control circuit outputs the control signal in response to executable instructions.

5. A system comprising:
a first integrated circuit having a first interface coupled to a first signal path, the first interface having a first plurality of contacts;
a second integrated circuit having a second interface coupled to the first signal path, the second interface having a second plurality of contacts;
wherein the first and second integrated circuits are operable in a first and second mode of operation, wherein:
during the first mode of operation, the first integrated circuit configures a first set of contacts in the first plurality of contacts to output and receive signals, the second integrated circuit configures a second set of contacts in the second plurality of contacts to output and receive signals to and from the first set of contacts, the first and second integrated circuits configure the first and second sets of contacts in response to a control signal; and
during the second mode of operation, the first integrated circuit configures a third set of contacts in the first plurality of contacts to output signals, the second integrated circuit configures a fourth set of contacts in the second plurality of contacts to receive the signals from the third set of contacts; and
a control circuit to output the control signal;
wherein the control signal is output in response to an indication as to a number of receive commands.

6. A system comprising:
a first integrated circuit having a first interface coupled to a first signal path, the first interface having a first plurality of contacts;
a second integrated circuit having a second interface coupled to the first signal path, the second interface having a second plurality of contacts;
wherein the first and second integrated circuits are operable in a first and second mode of operation, wherein:
during the first mode of operation, the first integrated circuit configures a first set of contacts in the first plurality of contacts to output and receive signals, the second integrated circuit configures a second set of contacts in the second plurality of contacts to output and receive signals to and from the first set of contacts, the first and second integrated circuits configure the first and second sets of contacts in response to a control signal; and during the second mode of operation, the first integrated circuit configures a third set of contacts in the first plurality of contacts to output signals, the second integrated circuit configures a fourth set of contacts in the second plurality of contacts to receive the signals from the third set of contacts; and a control circuit to output the control signal;

wherein the control signal is output in response to an average time a data packet waits.

7. A system comprising:

a first integrated circuit having a first interface;

a second integrated circuit having a second interface;

wherein the first and second integrated circuits are operable in a first and second mode of operation, wherein:

during the first mode of operation, the first interface is configured to transfer bidirectional signals between the first and second interfaces and the second interface is configured to transfer bidirectional signals between the first and second interfaces, wherein the first and second integrated circuits operate in response to a control signal; and during the second mode of operation, a portion of the first interface is configured to output unidirectional signals and a portion of the second interface is configured to receive the unidirectional signals from the first portion; and a control logic to output the control signal;

wherein the control signal is output in response to an indication as to the amount of data to be transferred between the first and second integrated circuits during a period of time.

8. The system of claim 7, wherein the first integrated circuit is included in a memory controller and the second integrated circuit is included in an integrated circuit memory device.

9. The system of claim 8, wherein the integrated circuit memory device is disposed on a memory module.

10. The system of claim 8, wherein the control signal is a memory command output by the memory controller.

11. The system of claim 8, wherein the first and second interfaces include a first and second transceiver, the first and second transceivers each include a transmit and receive circuit coupled to a serializer circuit and deserializer circuit.

12. The system of claim 8, wherein the control logic is included in the first integrated circuit.

13. The system of claim 12, wherein the control logic includes a register to output the control signal.

14. A method of operation in a system including a first integrated circuit having a first interface and a second integrated circuit having a second interface, the method comprising:

configuring the first interface to transfer bidirectional signals between the first interface and the second interface;

configuring the second interface to transfer bidirectional signals between the first interface and the second interface;

outputting a control signal that indicates an amount of data to be transferred between the first and second integrated circuits;

reconfiguring a portion of the first interface to output unidirectional signals to a portion of the second interface in response to the control signal; and reconfiguring the portion of the second interface to receive unidirectional signals from the portion of the first interface in response to the control signal, wherein the control signal is output in response to a number of transmit commands.

15. The method of claim 14, wherein the control signal is output in response to a request for bandwidth.

16. A method of operation in a system including a first integrated circuit having a first interface and a second integrated circuit having a second interface, the method comprising:

configuring the first interface to transfer bidirectional signals between the first interface and the second interface, the first interface having first and second portions;

configuring the second interface to transfer bidirectional signals between the first interface and the second interface, the second interface having first and second portions;

outputting a control signal that indicates an amount of data to be transferred between the first and second integrated circuits;

reconfiguring the first portion of the first interface to output unidirectional signals to the first portion of the second interface in response to the control signal; and reconfiguring the second portion of the second interface to receive unidirectional signals from the second portion of the first interface in response to the control signal, wherein the control signal is output in response to a number of receive commands.

17. A method of operation in a system including a first integrated circuit having a first interface and a second integrated circuit having a second interface, the method comprising:

configuring the first interface to transfer bidirectional signals between the first interface and the second interface, the first interface having first and second portions;

configuring the second interface to transfer bidirectional signals between the first interface and the second interface, the second interface having first and second portions;

outputting a control signal that indicates an amount of data to be transferred between the first and second integrated circuits;

reconfiguring the first portion of the first interface to output unidirectional signals to the first portion of the second interface in response to the control signal; and reconfiguring the second portion of the second interface to receive unidirectional signals from the second portion of the first interface in response to the control signal, wherein the control signal is output in response to an average time a data packet waits in the first integrated circuit.

* * * * *